(12) United States Patent
Yeo et al.

(10) Patent No.: US 7,453,635 B2
(45) Date of Patent: Nov. 18, 2008

(54) IMAGING MATERIAL WITH IMPROVED CONTRAST

(75) Inventors: Terence E. Yeo, Boston, MA (US); Zane A. Coleman, Chicago, IL (US)

(73) Assignee: Fusion Optix Inc., Cambridge, MA (US)

( * ) Notice: Subject to any disclaimer, the term of this patent is extended or adjusted under 35 U.S.C. 154(b) by 258 days.

(21) Appl. No.: 11/200,592

(22) Filed: Aug. 10, 2005

(65) Prior Publication Data

US 2006/0056022 A1 Mar. 16, 2006

Related U.S. Application Data

(60) Provisional application No. 60/598,826, filed on Aug. 4, 2005, provisional application No. 60/600,403, filed on Aug. 10, 2004.

(51) Int. Cl.
*G03B 21/60* (2006.01)
*G03B 21/56* (2006.01)

(52) U.S. Cl. .............. 359/453; 359/455; 359/456; 359/459; 359/460; 359/487; 359/492

(58) Field of Classification Search ......... 359/453–456, 359/459–460, 487, 492
See application file for complete search history.

(56) References Cited

U.S. PATENT DOCUMENTS 6,239,907 B1 * 5/2001 Allen et al. ............... 359/443
6,268,961 B1 * 7/2001 Nevitt et al. .............. 359/488
6,747,796 B1 * 6/2004 Dorling ..................... 359/452
6,958,860 B2 * 10/2005 Dontula et al. ............ 359/599

* cited by examiner

*Primary Examiner*—Diane I. Lee
*Assistant Examiner*—Magda Cruz

(57) ABSTRACT

An imaging material has been developed which provides improved image contrast, increased gain and increased viewing angle. A method for production of the screen element is also described. The imaging material of the invention includes a refractive optical element which redirects incident light along a desired axis, a light transmissive focusing region which diffuses the light along the desired axis, and a controlled light-transmissive region which controls backscatter and increases contrast. The refractive optical element desirably includes an active surface such as a lenticular array embossed thereon which serves to redirect incident light as desired. The focusing region desirably is made of a matrix material having a refractive index $n_1$, having dispersed throughout the matrix asymmetric micro-bodies that have a refractive index $n_2$ different from $n_1$. The controlled light-transmissive region may desirably comprise an alternating black stripe and transparent region. Various implementations of these elements of course are contemplated as within the scope of the invention The materials described herein are typically used in a rear and/or front projection display system such as those used in televisions, computers, home theatres, information displays and simulation systems.

15 Claims, 14 Drawing Sheets

IMAGING MATERIAL WITH IMPROVED CONTRAST

RELATED APPLICATIONS

This application claims the benefit of priority under 35 U.S.C. 119(e) to pending U.S. Provisional Application No. 60/600,403, filed on Aug. 10, 2004; and pending U.S. Application No. 60/598,826, filed on Aug. 4, 2005; the entire contents of which are incorporated herein by reference.

FIELD OF THE INVENTION

The invention generally relates to the design of a light transmitting screen element, and methods of manufacture, and more specifically its use in a rear and/or front projection display system, and liquid crystal displays (LCDs), such as those used in televisions, computers, home theatres, information displays and simulation systems.

BACKGROUND OF THE INVENTION

Imaging screens such as those used in rear projection typically have a diffusive element that has an undesirable level of backscatter that reduces contrast, especially in high ambient light situations. Traditional rear projection screens utilizing lenticular lenses and a black stripe material utilize a diffusion layer on the viewer side of the black stripes in order to increase the vertical and horizontal viewing angles. The methods for diffusion of the light include surface relief or volumetric diffusers. These diffusive elements significantly scatter ambient light back towards the viewer which reduces the contrast of the image. Such diffusion layers cannot be placed behind the black stripes because to do so would reduce the resolution of the imaging process used to produce those black stripes. The manufacturing processes typically involve UV curing or ablation by exposing through the lenticular. To place the diffusion layer behind the black stripe would have the effect of increasing the minimum achievable aperture, and in turn the maximum achievable black stripe width. Placing the diffusion layer behind the black stripes would also result in a loss of quality and definition of the edge of the black stripe. Also, by adding a diffusive element on the viewer side of the black stripe region, the thickness and cost of the screen is increased. The same is true of configurations that use microlens arrays that have a substantial optical orientation along one axis.

Typical projection screens use a single symmetric diffusion layer. However, often a symmetric amount of diffusion is not preferred. For example, in a screen application with the lenticules of a lenticular lens oriented vertically, the lenticules spread light in the horizontal direction and only minor additional diffusion is necessary in the horizontal in order to achieve diffusion of the source image. Whereas, significantly more diffusion may be required in vertical because the lenticular lens does not affect the vertical angles of light. When using a symmetric diffuser, the diffusion is the same in the horizontal and vertical directions. Therefore, when trying to reach a specific horizontal and vertical viewing angle target, it is likely that the viewing angle in the opposite direction is not optimized and this decreases the gain of the screen over the desired viewing angles. Increased control in the viewing angles for diffusers in an imaging material is needed for efficient use of the projected light.

Also, by adding a diffusing region on the viewing side screen, the ambient light reflected is increased. This reduces the image contrast of the display in ambient light conditions. The increased diffusion needed to expand the light in the vertical direction contributes to an increase in the ambient light reflected, thus reducing image contrast. Essentially, one would like to have better control of the amount of diffusion.

The demand for higher resolution displays has also increased the visibility of speckle. "Speckle" is the optical interference effect resulting from the interference of light rays emerging from a scattering element—such as a screen—that are mutually coherent. The viewers' eye integrates this optical effect and sees a visible pattern. Speckle is typically measured by looking at the variation in intensity across a uniformly illuminated screen. "Speckle contrast" is defined as the ratio of the standard deviation of the intensity to the average intensity. A projection system with "high" speckle contrast means that the speckle pattern is more visible than a system with "low" speckle contrast.

Screens that use more than one scattering layer typically use optical adhesives to combine the screen components; or, spherical light scattering particles are added to Fresnel lenses, lenticular lenses, substrates or other elements. This often introduces spurious interfacial reflections at the element interfaces, that reduces the contrast of the screen and adds to the production cost. When the interfaces are slanted or curved, such as the case with Fresnel lenses or lenticular lenses, respectively, the spurious reflections are more significant, and reduces the optical efficiency, and, possibly, reduce image contrast. For instance, a small amount of spherical particles added to a Fresnel lens to reduce speckle contrast can cause a significant amount of the scattered light to totally internal reflect within the Fresnel lens because of the large slant angles on the features of the Fresnel lens. This reduces the speckle contrast at the expense of reducing image contrast and reducing optical efficiency by lowering the screen transmission.

In projection systems, traditional methods for adding a diffusive region (volumetric or surface relief) in the light path before the aperture regions in the contrast enhancing element will increase the apparent size of the apertures and also result in decreased edge definition. This reduces the performance and increases the reflection of ambient light and the resulting backscatter reduces image contrast.

SUMMARY OF THE INVENTION

The present invention addresses a need in the art for an imaging material that provides reduced backscatter, low speckle contrast and high image contrast in a thin form factor; and methods for providing imaging materials with independent control of the viewing angles in the horizontal and vertical to provide high gain and increased ambient light absorption.

The imaging material of the invention includes a refractive optical element which redirects incident light along a desired axis, a light transmissive focusing region which diffuses the light along the desired axis, and a controlled light-transmissive region which controls backscatter and increases contrast. The refractive optical element desirably includes an active surface such as a lenticular array embossed thereon which serves to redirect incident light as desired. The focusing region desirably is made of a matrix material having a refractive index $n_1$, having dispersed throughout the matrix asymmetric micro-bodies that have a refractive index $n_2$ different from $n_1$. The controlled light-transmissive region may desirably comprise an alternating black stripe and transparent region. Various implementations of these elements of course are contemplated as within the scope of the invention, and are discussed in more detail below.

In one embodiment of this invention, asymmetric microbodies are located between the curved surface of the lenticules and the viewing side surface of the black stripe region. The asymmetric micro-bodies are aligned substantially perpendicular to the lenticules such that the light scatters parallel to the lenticules. In another embodiment, an imaging material is comprised of more than one asymmetric scattering region located between the curved surface of the lenticules and the viewing side surface of the black stripe region. In another embodiment of this invention, a method for producing an imaging material with improved contrast includes a step for exposing the black stripe region through the region containing asymmetric particles.

DETAILED DESCRIPTION OF THE INVENTION

Figure 1:
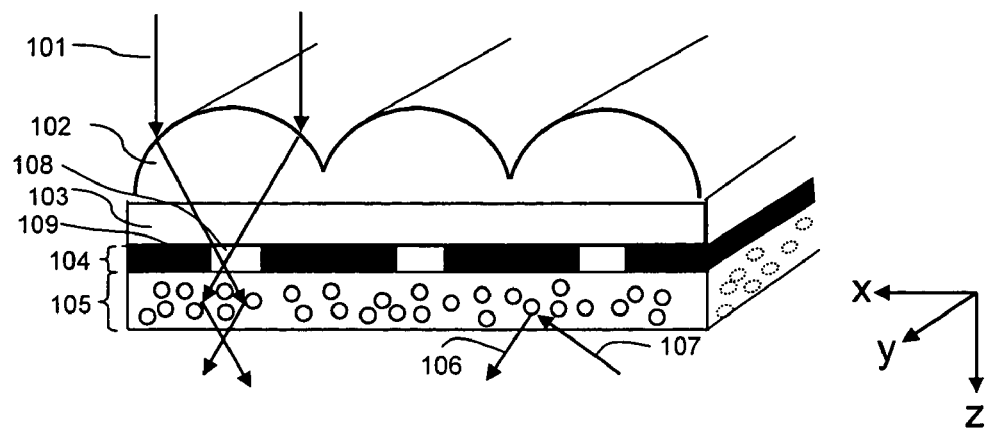
FIG. 1 is a perspective view of an example of prior art illustrating an imaging material consisting of a lenticular lens and black stripe material with a symmetric diffuser on the "viewer side" of the lenticular lens.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Speckle" includes scintillation or the optical interference pattern visible on a diffusing element.

"Speckle Contrast" is defined herein as the ratio of the standard deviation of the intensity fluctuation to the mean intensity over the area of interest.

"Diffuse" and "diffusing" as defined herein includes light scattering by reflection, refraction or diffraction from particles, surfaces, or layers or regions.

"Optically coupled" is defined herein as including the coupling, attaching or adhering two or more regions or layers such that the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the regions or layers such as Optically Clear Adhesive 8161 from 3M (with a refractive index at 633 nm of 1.474). Examples of optically coupling include lamination using an index-matched optical adhesive such as a pressure sensitive adhesive; coating a region or layer onto another region or layer; extruding a region or layer onto another region or layer; or hot lamination using applied pressure to join two or more layers or regions that have substantially close refractive indices. A "substantially close" refractive index difference is about 0.5, 0.4, 0.3 or less, e.g., 0.2 or 0.1.

"Screen assembly" is defined herein as a single or combination of elements that can be components of a rear projection screen or alternatively an assembly suitable as a rear projection screen without the need for additional elements.

"Imaging Material" is defined herein as a single or combination of materials that can be elements of a projection screen or alternatively a material suitable as a projection screen without the need for additional elements.

"Hardcoating" or "Hardcoat" is a coating applied to a surface of a screen element that hardens the surface of the screen element, thus reducing the appearance of scratches and protecting the screen element. Hardcoats can include antiglare or surface relief characteristics or they can be coating onto surface relief structures providing anti-glare properties.

The "Gain" of a screen or light scattering element is the ratio of the maximum luminance of an illuminated light transmitting material in a given direction relative to the luminance of a theoretically perfect diffuser in the same direction. To measure the gain of a particular sheet of material, a known amount of light is directed to the sheet, and the maximum luminance is measured using a standard luminance meter. The maximum luminance of light measured is then compared to a theoretically "perfect" diffusive material.

The gain for an imperfect diffuser is the value of the maximum luminance (ML) divided by the value of the luminance of the theoretically perfect diffuser. For a theoretically perfect transmissive Lambertian diffuser material, providing one foot-candle (10.76 lumen/m2) of illumination to the material results in the luminance of one footlambert at all angles. Therefore, if the maximum luminance by a material from transmitted light is equal to one footlambert, its gain with respect to a theoretical diffuser is 1.0 for that angle of transmission. For imperfect diffusers the gain will be maximum (ML) and larger than 1 for a given viewing direction (typically measured orthogonal to the plane of the diffuser).

Thus a high gain screen will typically be brighter when viewed orthogonal to the plane than at other angles. Because the light transmitted by the material can never be more than the amount of light supplied, less light must be transmitted at angles other than the angle of maximum luminance.

"Angle of view" (AOV) is a measurement of illumination for all angles relative to two perpendicular axes in the plane of the material. These are called the X axis or the horizontal axis, and the Y axis or the vertical axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the measured luminance is one-half the maximum luminance measured and noted. For example, if angles of +35° and −35° were measured to have one-half of the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\chi(\frac{1}{10})$) are calculated similarly, except that they are calculated from the angles at which the luminance is one-third and one-tenth of the maximum luminance respectively.

The "asymmetry ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

A "micro-body" and "micro-bodies" as used herein refer to confined regions having distinct boundaries of different optical or physical characteristics without regard to specific shapes and sizes. Typically the region will have a different refractive index from the neighboring region. Examples of micro-bodies include particles, particulates, dispersed phases, phases within a matrix of material, gaseous bubbles within a material, voids, spheres, microspheres, hollow microspheres, fibers, etc.

A "spheroidal" or "symmetric" particle includes those substantially resembling a sphere. A spheroidal particle may contain surface incongruities and irregularities but has a generally circular cross-section in substantially all directions. A spheroid is a type of ellipsoid wherein two of the 3 axes are equal. An "asymmetric" particle is referred to here as an "ellipsoidal" particle wherein each of the three axis can be a different length. Typically, ellipsoidal particles resemble squashed or stretched spheres.

The imaging material of the invention includes a refractive optical element which redirects incident light along a desired axis, a light transmissive focusing region which diffuses the light along the desired axis, and a controlled light-transmissive region which controls backscatter and increases contrast.

The imaging material of this invention uses a refractive optical element to focus light through transparent apertures in order to reduce the spatial extent while increasing the angular extent of the ray bundles. By using absorptive (opaque) material in the regions between the focal regions on the viewer side of the imaging material, more of the ambient light is absorbed. The angular extent of the light is controlled by the refractive element and diffusive elements within the imaging material.

The refractive optical element desirably includes an active refracting surface such as a lenticular array embossed thereon which serves to redirect incident light as desired. The refractive optical element and the other elements of the inventive imaging material are comprised of a light-transmissive matrix material, which may each differ of course in the degree of light transmission. The matrix material may differ between the elements depending on the desired optical, physical, mechanical, processing and other characteristics desired. The matrix materials used are preferably durable, stable, and allow optical coupling to other materials, such as a hardcoat, an anti-reflective coating, or a contrast enhancement layer. The matrix material may also comprise asymmetric micro-bodies or other additives that do not significantly interfere with the basic function of the refractive optical element. Suitable matrix materials include acrylics, such as polymethylmethacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; and polycarbonates. The matrix may also include compatibilizers to improve the processing and performance of the material. In a preferred embodiment, Spectar 14471 copolyester from Eastman Chemical Company may be used.

The active surface of the refractive optical element is typically recorded by embossing or casting a form into a light transmissive medium. In one example, a refractive optical element formed as a lenticular lens structure is embossed into a sheet from a lenticular tool, thus forming a lenticular lens. In a further example, the form (or tool) is holographically mastered and then stamped or embossed into the material. The active surface may also be made by exposure to radiation that ablates surface material or alters the physical, chemical, or optical properties to result in the active surface. The active surface may also be a microlens layer, preferably where the lenses are packed close together so that the entirety of the surface of the lens layer is covered with the lens structures. The refractive optical element can be a regular, random or semi-random array of microstructures that refract the incident light. Refractive optical elements include lenticular lens arrays, microlens arrays, and graded-refractive index arrays. The shape and profile of the features may incorporate aspherical shapes or dispersion corrected diffractive features. Multi-layered refractive features or multiple refractive elements that achieve higher resolution or optical performance may be used. The refractive structures typically have surface features larger than 2 μm in one or more directions such that the angle of the surface and the refractive index determine the output direction of light rays from a specific angle. The surface may also have features providing additional benefits that are less than 2 μm, such as anti-reflection moth-eye structures, diffractive structures, or holographic structures. The features smaller than 2 μm may also be random in shape, size or distribution in order to diffract the light in order to achieve unique color or angular properties. How to obtain such surface structures is well known in the art.

The focusing region preferably contains materials with two different refractive indexes. In a preferred embodiment, the interfacial surfaces form asymmetric structures that will asymmetrically refract, diffuse, diffract, or scatter light. In one embodiment, the focusing region is made of a matrix material having a refractive index $n_1$, having dispersed throughout the matrix asymmetric micro-bodies that have a refractive index $n_2$ different from $n_1$. The matrix material is suitably the same as that used in the refractive optical element, or different. Volumetric scattering elements include asymmetric micro-bodies which scatter light in a controlled manner, asymmetrically shaped particles, graded-refractive index (GRIN) lenses or regions, holographically or optically formed asymmetric regions. The light scattering asymmetric micro-bodies within the bulk volume of material may vary in size, shape, concentration, distribution, and composition, providing that the refractive index within the volume of the material varies in the desired direction, e.g., x, or y, sufficiently to asymmetrically scatter incident light. Example of asymmetric, volumetric scattering materials include stretched asymmetric particles in a host matrix material, radiation exposed photopolymers that enable refractive index variations, asymmetrically shaped voids or regions of materials or elements that differ in refractive index of the host matrix material, and embedded surface relief features.

The focusing region may also contain a surface relief structure wherein one of the two materials is air such that the refractive index is approximately 1.0. The asymmetric surface relief structure can be manufactured by similar techniques as the refractive optical element described above. The surface relief structure may be within the focusing region or form the boundary between the focusing region and another element. In a preferred embodiment, the asymmetric surface relief interface within the focusing region contains asymmetrically shaped features predominantly aligned in the horizontal or vertical directions such that they refract, diffract, scatter, diffuse the incident light in the horizontal or vertical directions.

The thickness of the elements of the imaging material of the invention affects the resolution, gain and speckle contrast. In one embodiment, the thickness of one or more of the elements is less than 10 mm. In another embodiment, the thickness may be less than 9, 8, 7, 6 or 5 mm. In another embodiment, the thickness may be less than 3mm. In a more preferred embodiment, the thickness of one or more of the elements is less than 2 or 1 mm.

The asymmetric micro-bodies can be added to the matrix material during processing or they can be created during manufacturing. In one embodiment of this invention, particles not substantially asymmetric in shape may be stretched along an axis after coating or during or after an extruding process such that they become asymmetric in shape. Other methods for achieving a single region of asymmetric particles in a region are disclosed in U.S. Pat. No. 5,932,342, the text of which is incorporated herein by reference. By using multiple layers or multi-region methods such as co-extrusion, optical lamination, optical coupling, thermal bonding, multiple regions containing light scattering particles can be combined into a single light scattering element. The degree of stretching can control the asymmetry and thus achieve a desired level of asymmetric light scattering. The asymmetric particles may have a large variation in size depending on the desired level of asymmetry.

In one embodiment of the invention, the asymmetric particles in the imaging element are obtained by reducing particles in size in the x, y or other directions by stretching a film after or during extrusion. These particles have a refractive index $n_{p1}$ different from the host matrix material refractive index $n_{h1}$ defined by at least one of $|n_{hx1}-n_{px1}| \geqq 0.001$, $|n_{hy1}-n_{py1}| \geqq 0.001$, or $|n_{hz1}-n_{pz1}| \geqq 0.001$ such that sufficient light scattering for the desired viewing angle is achieved. In a preferred embodiment, the particles are located in more than one region with the regions spaced apart by a non-scattering region of the host matrix material.

The asymmetric features, e.g., micro-bodies, typically are all oriented with their major axes substantially in one direction in the plane of the surface of the material. Desirably, the particles are made from a material which is capable of being deformed at a processing temperature in order to create their asymmetric or ellipsoidal shape by stretching. Further, the volume density of the particles, the average ellipsoidal particle minor axis size, and the index of refraction the ellipsoidal particles may be optimized to control desired properties of the material.

The average particle size of the particles in the matrix may be from about 1 µm to about 30 µm, preferably from about 2 µm to about 15 µm, and most preferably from about 2 µm to about 5 µm in the minor dimension.

The differential refractive index ($\Delta n_{ME}$) defined as the absolute value of the difference between the index of refraction of the matrix ($n_M$) and the index of refraction of the ellipsoidal particles ($n_E$), or $|n_M-n_E|$, may be from about 0.005 to about 0.2, and preferably is from about 0.007 to about 0.1.

Suitable materials for the particles include acrylics such as polymethylacrylates; polystyrenes; polyethylenes;; polypropylenes; organic acid cellulose esters such as cellulose acetate butyrates, cellulose acetates, and cellulose acetate propionates; polycarbonates; or silicones. The particles may also contain coatings of higher or lower refractive index materials, or they may be hollow materials containing a gas mixture such as air. In a preferred embodiment, polyethylene may be used.

The differential refractive index ($\Delta n_{MS}$) defined as the absolute value of the difference between the index of refraction of the matrix ($n_M$) and the index of refraction of the particles ($n_S$), or $|n_M-n_S|$, may be from about 0.005 to about 0.2, and preferably is from about 0.007 to about 0.1.

For the imaging element of the invention to have improved ambient light absorption, the transparent regions should be as small as possible. In the case of planar controlled light transmissive regions, the aperture ratio is typically used to quantify the relative areas of the transparent and opaque regions. The aperture ratio is defined as the ratio of the area of the transparent regions to the area of the opaque regions. A low aperture ratio results in improved ambient light absorption, however, very small aperture ratios typically absorb a significant amount of the incident light (from a projector for example) that can not be accurately focused through the transparent apertures by the refractive optical element.

Typically diffusive elements are not positioned between the refractive optical element and the controlled light transmissive region because they increase the size of the exposed region corresponding to the light transmissive regions. This increase would reduce the ambient light absorption (thus decreasing image contrast). However, by careful choice of asymmetrically diffusing elements and refractive optical elements, the spread of light could be in a direction that does not increase the size of the light transmissive region. For example, by using a lenticular lens with the lenticules aligned in the vertical direction (the major axis of the lenticular lens array is in the y direction), optically coupled to a region containing asymmetric micro-bodies aligned in the x or horizontal direction, the light refracts in the x-z (horizontal) plane due to the lenticular lens and scatters in the y-z (vertical) plane due to the asymmetric scattering region. Thus, the collimated incident light will be spread in the vertical direction and focused in the horizontal direction. The scattering is in a direction parallel to the transparent stripes and lenticules that are needed for the contrast enhancement in the controlled light transmissive region. The asymmetric microbodies should be oriented horizontally (i.e., perpendicular to the lenticules) so the scattering is substantially in the vertical direction (i.e., parallel to the lenticules). Thus, the collimated light is focused through the asymmetric micro-bodies with the light scattering only in the vertical direction. This achieves vertical scattering before the controlled light-transmissive region such that additional scattering regions after the controlled light transmissive-region are not required. Therefore, the resulting line widths could be the same as that of a traditional lenticular lens—black stripe configuration by placing an asymmetric scattering region between the lenticular lens and the black line-transparent stripe region. With this, the optical efficiency and resolution could be maintained while reducing the ambient light reflection because an additional diffuser is not needed on the viewer side of the black stripe region or the backscatter would be less if one chose to use an additional diffuser.

The alignment of the asymmetric micro-bodies can also vary within the region of scattering and between different regions. By aligning the particles with respect to the lenticules at angles other than parallel or perpendicular, other asymmetric viewing angles can be achieved. The asymmetric micro-bodies will inevitably cause some scattering in the minor axis. This may be designed to be very small, or significant. In one embodiment, the scattering in the minor axis is chosen to be just sufficient to diffuse the specular component of the light source in the plane perpendicular to major axis of the lenticular lens array.

The controlled light-transmissive region is preferably designed and registered to the refractive optical element and its focal points. In this manner, light can be effectively focused through the apertures. The pattern of the light transmission region could be stripes (linear apertures), circular apertures, square apertures, or other regular or irregular apertures including random apertures. In a preferred embodiment, the controlled light-transmissive region comprises a black stripe region, and is most desirably optically coupled to the region overlying it. The controlled light-transmissive region may consist of a photosensitive material such as Cromalin™ (DuPont) which can be processed to produce black stripes in the unexposed regions. Other materials may include a black layer that is sensitive to the exposure of light such that black material is ablated in the regions of exposure. Other materials known to the printing and photographic industry to produce black regions such as thermal transfer and laser photo-degredation may be used to produce the black stripe region. These stripes or other shaped opaque regions could be then be registered to the refractive optical element and it's focal points.

The thickness of the refractive optical element and its substrate may be adjusted such that the focal point is before, within, or beyond the light scattering element or controlled light transmissive region. For example, a thinner substrate could be used such that the horizontal focal point was near the interface between the asymmetric light scattering element and the controlled light transmissive region. In another embodiment, the asymmetric micro-bodies are located within the volume of the refractive optical element or its substrate.

The refractive elements are typically designed for collimated light illumination, both in manufacturing (exposing the black stripe region) and use as an imaging material. However, the incident light in some projection systems is not very well collimated and may be diverging for example. The elements, their manufacturing process and the display incorporating them may be designed or used with non-collimated light. For example, off-axis light may be used that is substantially collimated, or alternatively, slightly diverging light may be used that is on-axis or off-axis. Various configurations of collimated, diverging, converging, scanned, and coherent light and the resulting design and manufacturing conditions for imaging elements are known in the industry are considered within the scope of this invention.

Each of the elements described above are desirably optically coupled to one another, i.e., so the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in-between the elements or layers.

Particles that are significantly smaller than the wavelength of light may be added to one or more of the elements to alter the effective refractive index. In one embodiment, the size of the particles are less than $1/10^{th}$ the wavelength of light. In a preferred embodiment, the size of the particles are less than $1/20^{th}$ the wavelength of light of interest such that significant additional scattering (forward or backward) does not take place. These particles may be symmetric, asymmetric, or random in shape. For example, very fine particles of titanium dioxide may be added to a material to increase the effective refractive index of the material. The effective refractive index change can adjust the scattering properties of the material, is refractive properties, and the interfacial reflections.

The multi-region element of the invention may also include an optional hardcoat to increase the stability of the element, and/or an optional anti-reflective coating. The hardcoat may be any light-transmissive support layer, such as a siloxane-based polymer layer. Optionally, the hardcoat may include a tint, traditionally used to increase the contrast of the screen.

Referring now to the figures, FIG. 1 illustrates one example of prior art. Collimated light from a Fresnel lens 101 is focused by a lenticular lens 102 and substrate 103 through the clear apertures 108 in a black stripe—clear aperture material 104. This light is then diffused by a symmetric diffuser 105 which scatters the light in both the horizontal and vertical directions. Much of the ambient light 107 incident on the symmetric diffuser will be absorbed by the opaque (black) region 109, however a significant amount will scatter back toward the viewer 106, thus reducing the contrast of the screen. The scattering region increases the viewing cone in the vertical direction and the horizontal direction. Typically, this unwanted additional spread of the light in the horizontal direction will have an undesirable effect of reducing the screen brightness. Typically, the larger the angles of diffusion for the light scattering element, the larger the backscatter. Therefore, it is desirable to have less diffusion within the light scattering element on the viewer side of the imaging element.

Figure 2:
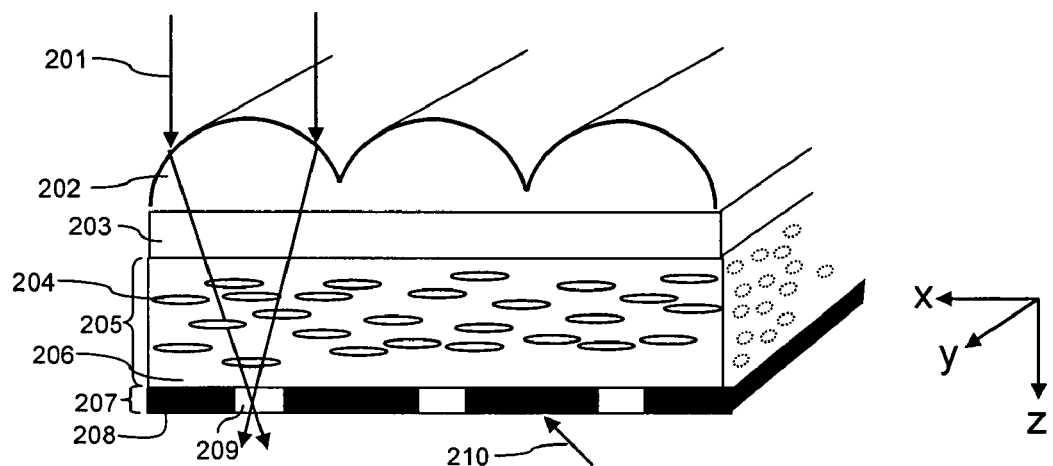
FIG. 2 is a perspective view of one embodiment of an imaging material of the invention, featuring a region containing asymmetric micro-bodies located between a lenticular lens and a black stripe region.

FIG. 2 illustrates an embodiment of this invention. An imaging material having improved contrast contains asymmetric micro-bodies located in a region 205 between a lenticular lens 202 and a black stripe region 207. The lenticules are aligned in the vertical direction (y direction) so the incident light is focused in the horizontal direction (x-z plane) by the lenticular lens refractive optical element 202 and spread in the vertical direction (y-z plane) by the asymmetric micro-bodes such that it passes through the transparent apertures 209. The asymmetric micro-bodies are oriented horizontally (x direction, perpendicular to the lenticules) within a matrix material 206 such that the scattering is substantially in the y-z plane. The collimated light 201 from a Fresnel lens is thus focused by the lenticular lens 202 through the substrate 203 and asymmetric micro-bodies 204 with the light scattering only in the vertical direction. This achieves necessary vertical scattering before the light reaches the controlled light-transmissive region (here and in other examples exemplified by a black stripe region.) Thus, an additional diffuser is not required after the black stripe region, and more ambient light 210 is absorbed in the opaque regions 208 because there is less backscatter due to a diffusing region on the viewer side of the black stripe region.

Figure 3:
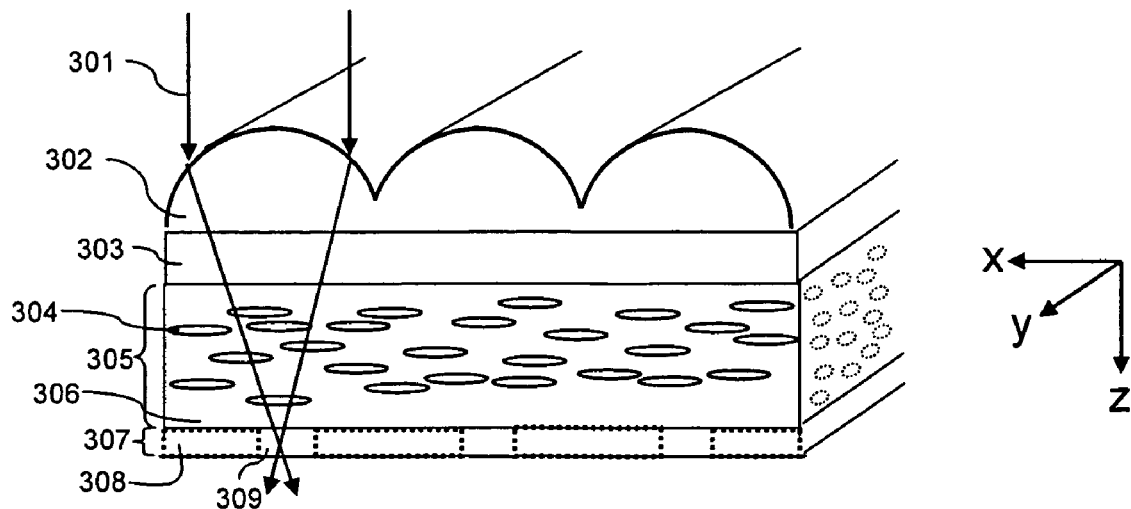
FIG. 3 is a perspective view of the exposure step of one embodiment of a method for producing the imaging material of FIG. 2.

FIG. 3 illustrates one embodiment of a method of producing the imaging material of FIG. 2. Substantially collimated light 301 is directed through a lenticular lens 302 (with its lenticules parallel to the y direction) and a substrate 303, which focuses the exposing light in the horizontal direction (x-z plane) through the asymmetric light scattering region 305 containing asymmetric micro-bodies 304 in a matrix 306 which scatter the light in the vertical direction (y-z plane). This produces substantially linear regions of exposure 309 corresponding to the clear apertures 209 (FIG. 2) and unexposed regions 308 that correspond to the opaque regions 208 (FIG. 2) within the black stripe region 307. The exposing light may be light in the UV, visible, or infrared spectrum such that the photosensitive region is capable of being processed to achieve the black stripe pattern.

Figure 4:
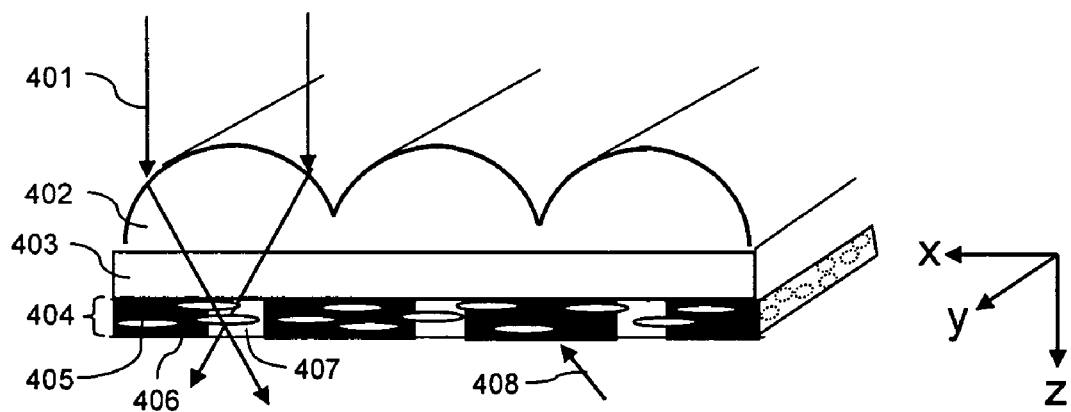
FIG. 4 is a perspective view of one embodiment of an imaging material of the invention, featuring asymmetric micro-bodies located within a black stripe region that is optically coupled to a lenticular lens.

FIG. 4 illustrates an imaging material of the invention with a lenticular lens and asymmetric micro-bodies within a black stripe region optically coupled to the lenticular lens. Collimated light 401 from the Fresnel lens is focused by the lenticular lens 402 (with its lenticules parallel to the y direction) through its substrate 403 and the asymmetric micro-bodies 405 located within the black stripe region 404. The light is transmitted through the clear apertures 407. Ambient light 408 reaching the opaque portions 406 of the black stripe region is absorbed.

Figure 5:
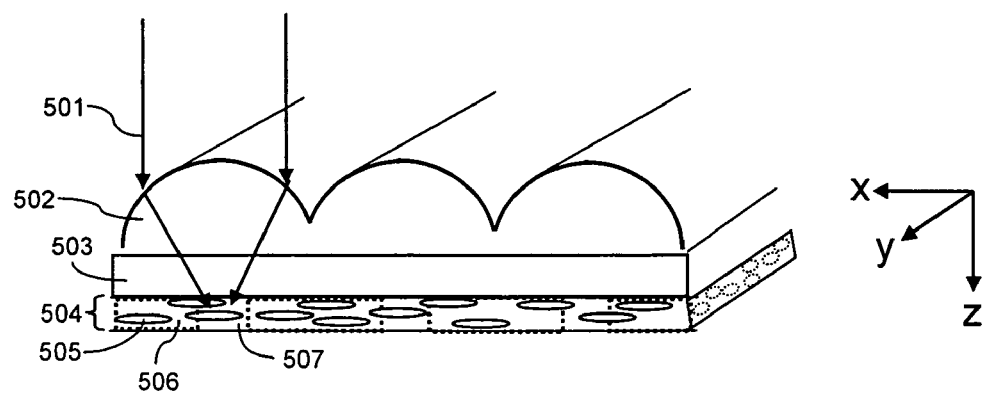
FIG. 5 is a perspective view of the exposure step of one embodiment of a method for producing the imaging material of FIG. 4.

FIG. 5 illustrates a method of producing the imaging material of FIG. 4. Collimated exposing light 501 is focused by the lenticular lens 502 (with its lenticules parallel to the y direction) through its substrate 503 and into a region 507 corresponding to a clear aperture 407 of the black stripe region 504 after processing. The unexposed region 506 corresponds to an opaque region 406 after processing. The asymmetric micro-bodies 505 are located within the black stripe region 504 before exposure. The particles can be aligned in the black stripe region by stretching or they can be created within the region this could be optically coupled to the lenticular lens 503 such that they are oriented substantially perpendicular to the lenticules before or after exposure.

Figure 6:
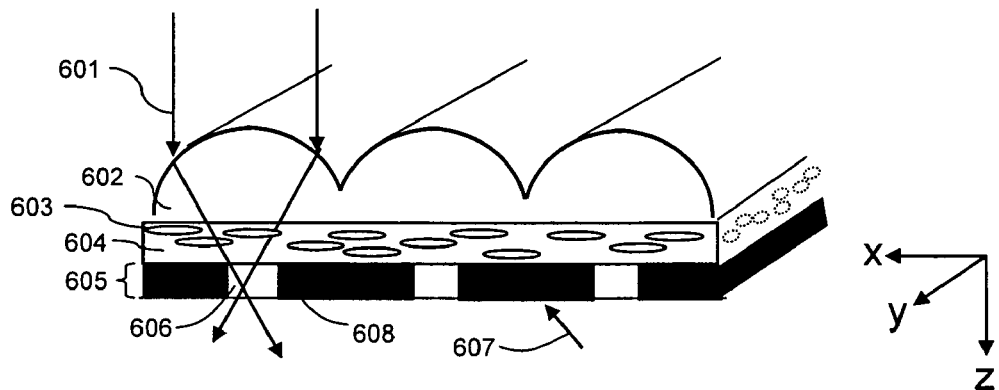
FIG. 6 is a perspective view of one embodiment of an imaging material of the invention, featuring asymmetric micro-bodies located within a lenticular lens supporting substrate, and a black stripe region optically coupled to the lenticular lens.

FIG. 6 illustrates an imaging material of the invention where asymmetric micro-bodies are present within the matrix of the lenticular lens, which is optically coupled to a black stripe region. The asymmetric micro-bodies 603 are in a matrix matrix material 604 used as a substrate for the lenticular lens and are oriented with their major axis perpendicular to the lenticules. Collimated light 601 from a Fresnel lens is focused by the lenticular lens 602 (with its lenticules parallel to the y direction) through the asymmetric micro-bodies 603 and through the clear apertures 606 in the black stripe region 605. Ambient light 607 is absorbed in the opaque regions 608 of the black stripe region. 605. By placing the asymmetric micro-bodies within the substrate for the lenticular lens (or similarly other refractive optical element), the addition of a diffusing element between the refractive optical element and the controlled light transmissive region does not increase the focal length of the lenticular lens or the thickness of the imaging element.

Figure 7:
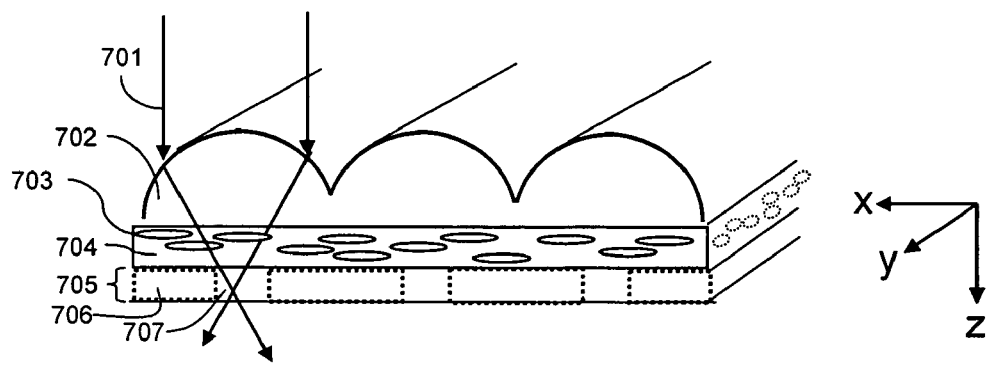
FIG. 7 is a perspective view of the exposure step of one embodiment of a method for producing the imaging material of FIG. 6.

FIG. 7 illustrates a method of producing the imaging material of FIG. 6. A layer containing asymmetric micro-bodies is used as a substrate to form the lenticular lenses through well-known techniques of embossing, casting, or extruding. Stretching can align the particles, or they can be created such that they are oriented perpendicular to the lenticules. Collimated exposing light 701 is focused by the lenticular lens 702 (with its lenticules parallel to the y direction) through the asymmetric micro-bodies 703 within the substrate 704 (matrix material) of the lenticular lens 702 into a clear aperture 707 of the black stripe region 705 corresponding to a clear aperture 606 after processing. The unexposed region 706 corresponds to an opaque region 608 after processing.

Figure 8:
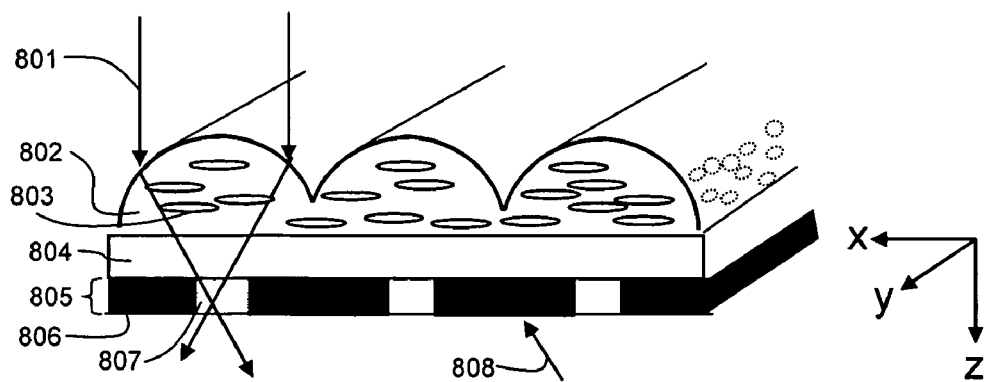
FIG. 8 is a perspective view of one embodiment of an imaging material of the invention, featuring asymmetric micro-bodies located within the lenticules of a lenticular lens, and a black stripe region optically coupled to the lenticular lens.

FIG. 8 illustrates an imaging material of the invention which features asymmetric micro-bodies within the lenticules of a lenticular lens layer which is optically coupled to a black stripe region. Collimated light 801 from a Fresnel lens is focused by the refractive surface of the lenticular lens 802 (with its lenticules parallel to the y direction) through the asymmetric micro-bodies 803 within the refractive element and through the substrate 804 and the clear apertures 807 in the black stripe region 805. Ambient light 808 is absorbed in the opaque regions 806 of the black stripe region.

Figure 9:
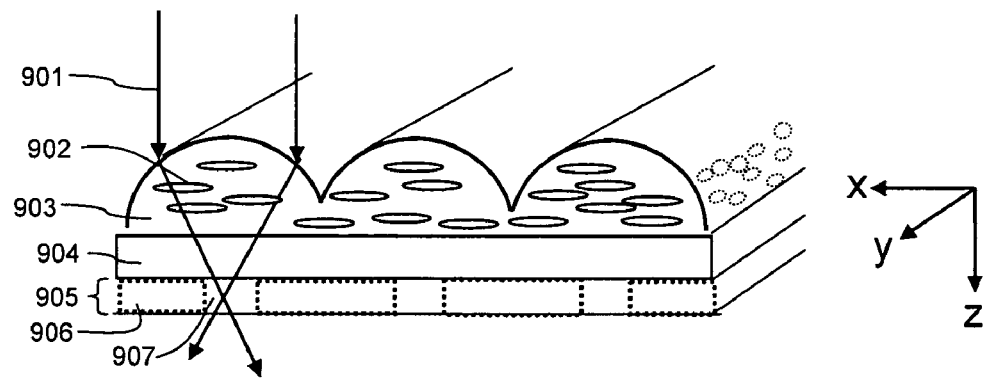
FIG. 9 is a perspective view of the exposure step of one embodiment of a method for producing the imaging material of FIG. 8.

FIG. 9 illustrates a method of producing the imaging material of FIG. 8. A lenticular structure is formed into a region containing asymmetric micro-bodies. Collimated exposing light 901 is focused by the lenticular lens 903 (with its lenticules parallel to the y direction) is through the asymmetric micro-bodies 902 within the lenticular lens 903 (matrix material) into a region 907 corresponding to a clear aperture 807 of the black stripe region 905 after processing. The unexposed region 906 corresponds to an opaque region 806 after processing.

Figure 10:
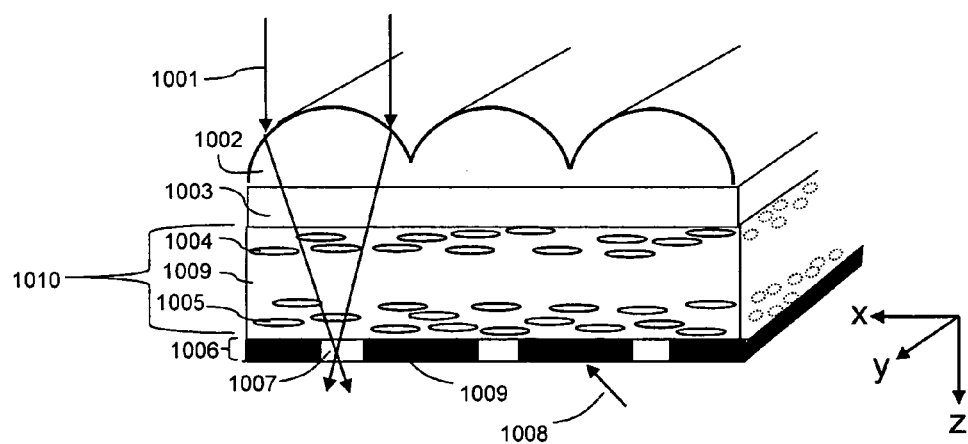
FIG. 10 is a perspective view of one embodiment of a multi-phase imaging material of the invention, featuring two regions containing asymmetric particles, separated by a non-diffusing region located between a lenticular lens and a black stripe region.

FIG. 10 illustrates another imaging material of the invention. Two regions containing asymmetric micro-bodies are separated by a substantially non-diffusing region. The asymmetric regions are located between a lenticular lens and a black stripe region. Collimated light 1001 from a Fresnel lens is focused by the refractive surface of the lenticular lens 1002 (with its lenticules parallel to the y direction) through the substrate 1003 and into the mult-region light scattering element 1010. The multi-region light scattering element 1010 contains regions containing asymmetric micro-bodies 1004 and 1005 within and separated by a matrix material 1009 The light passes through the multi-region light scattering element 1010 and through the the clear apertures 1007 in the black stripe region 1006. Ambient light 1008 is absorbed in the opaque regions 1009 of the black stripe region 1006. The multiple region light scattering element reduces the speckle contrast when the imaging material is used with a light source exhibiting a degree of coherence. The asymmetric scattering regions may vary in thickness. The size, shape, and materials used for the asymmetric micro-bodies may vary within and amongst the regions. More than two scattering regions may be used, and the substantially non-scattering regions between them may vary in thickness. As shown in further illustrations below, the scattering regions may be located within other elements of the imaging material or as separate elements with similar improved performance due to reduced speckle contrast.

Figure 11:
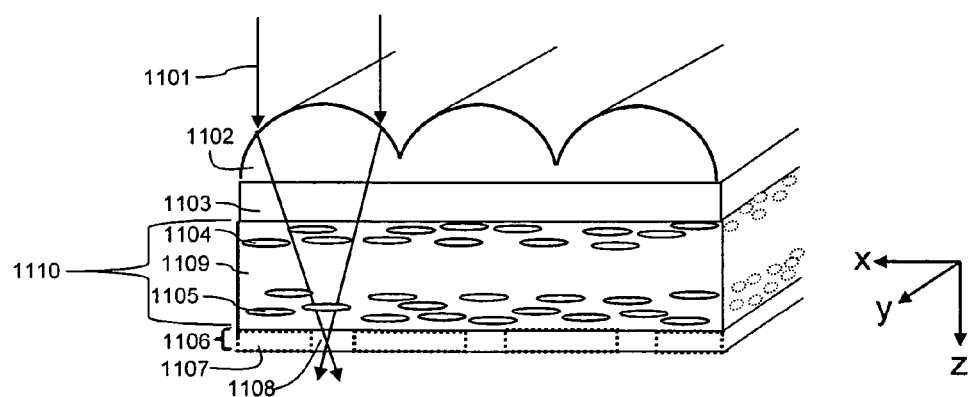
FIG. 11 is a perspective view of the exposure step of one embodiment of a method for producing the imaging material of FIG. 10.

FIG. 11 illustrates a method of producing the imaging material of FIG. 10. A multi-region imaging material is created containing at least two regions containing asymmetric micro-bodies that are spaced apart by a substantially non-scattering region. These regions may be optically coupled together, e.g., by co-extrusion or hot-laminating. This multi-region light scattering element is optically coupled to a lenticular lens and a black stripe region. Collimated exposing light 1101 is focused by the lenticular lens 1102 (with its lenticules parallel to the y direction) through the substrate 1103 and through the multi-region light scattering element 1110. The multi-region light scattering element 1110 contains two regions with asymmetric micro-bodies 1104 and 1105 spaced apart by a matrix material 1109. The light focuses through the multi-region light scattering element and exposes a region 1108 corresponding to a clear aperture 1007 of the black stripe region 1106 after processing. The unexposed region 1107 corresponds to an opaque region 1009 after processing.

Figure 12:
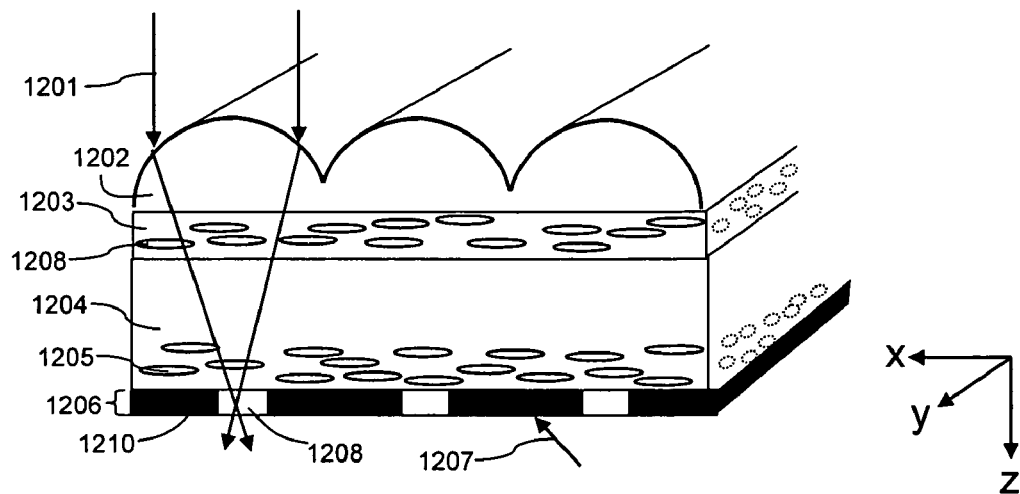
FIG. 12 is a perspective view of one embodiment of a multi-phase imaging material of the invention, featuring asymmetric micro-bodies located within the substrate of a lenticular lens and also in an intervening light-transmissive region optically coupled to a black stripe region.

FIG. 12 illustrates another embodiment of an imaging material of the invention with improved contrast. Two regions containing asymmetric micro-bodies are separated by a substantially non-diffusing region. At least one of the regions containing asymmetric micro-bodies is located within the substrate of a lenticular lens. Collimated light 1201 from a Fresnel lens is focused by the refractive surface of the lenticular lens 1202 (with its lenticules parallel to the y direction) through the substrate matrix material 1203 that contains asymmetric micro-bodies 1208. This light is further focused through a matrix region 1204 containing asymmetric micro-bodies 1205 that further scatters the light. The two scattering regions form a multi-region light scattering element separated by a matrix material 1204. The light passes through the multi-region light scattering element 1010 and through the clear apertures 1208 in the black stripe region 1206. Ambient light 1207 is absorbed in the opaque regions 1210 of the black stripe region 1206. In a further embodiment, the matrix materials 1203 and 1204 are the same material to reduce unwanted reflections.

Figure 13:
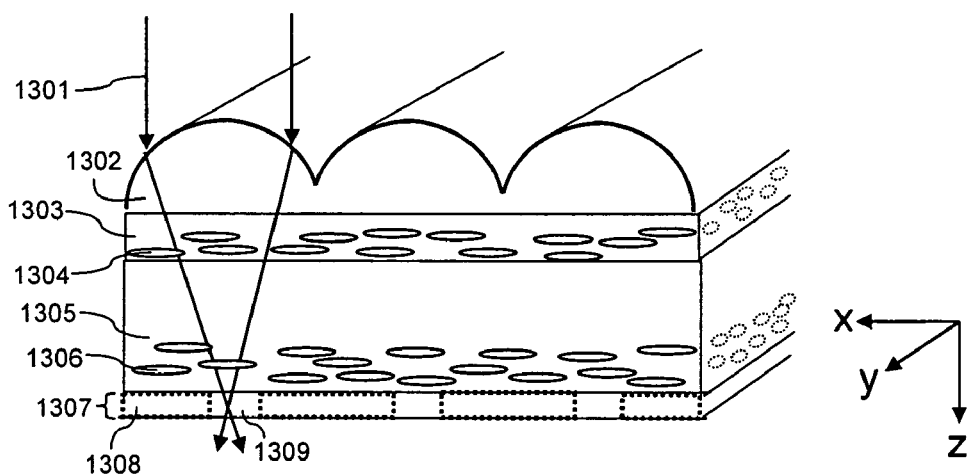
FIG. 13 is a perspective view of the exposure step of one embodiment of a method for producing the imaging material of FIG. 12.

FIG. 13 illustrates a method of producing the multi-region imaging material of FIG. 12. A multi-region imaging material is created containing at least two regions containing asymmetric micro-bodies are spaced apart by a substantially non-scattering region. At least one of these regions is located within the substrate of a lenticular lens. The lenticular lens can be formed upon this substrate through techniques such as extrusion, casting, or embossing. The lenticules are optically coupled to the multi-region light scattering element which is optically coupled to a black stripe region. In another step of this method, collimated exposing light 1301 is focused by the lenticular lens 1302 (with its lenticules parallel to the y direction) through the substrate (matrix material) 1303 containing asymmetric micro-bodies 1304 and into another matrix material 1305 containing asymmetric microbodies 1306 separated from the first region containing asymmetric microbodies 1304 by the matrix material 1305. The two scattering regions form a multi-region light scattering element which contains two regions with asymmetric micro-bodies 1304 and 1306 spaced apart by a matrix material 1305. The light focuses through the multi-region light scattering element and exposes a region 1309 corresponding to a clear aperture 1208 of the black stripe region 1307 after processing. The unexposed region 1308 corresponds to an opaque region 1210 after processing.

Figure 14:
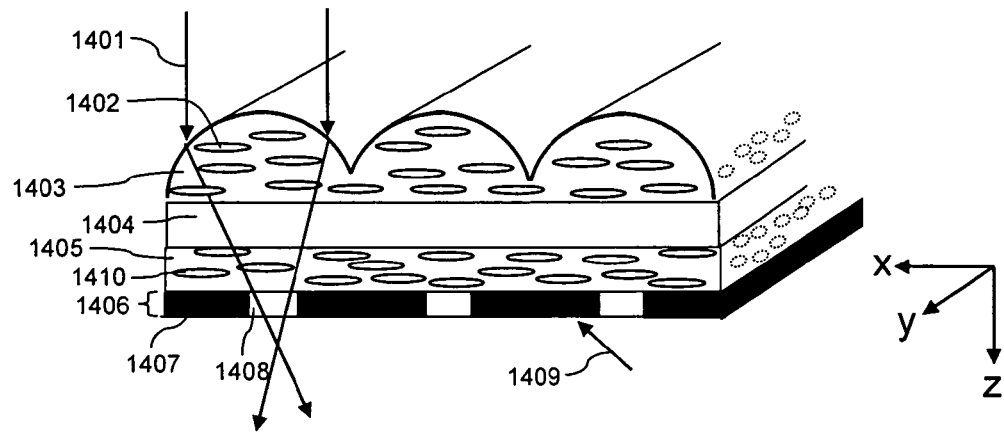
FIG. 14 is a perspective view of one embodiment of an imaging material of the invention, featuring asymmetric micro-bodies located within the lenticules of a lenticular lens and also in an intervening light-transmissive region optically coupled to a black stripe region.

FIG. 14 illustrates another embodiment of a multi-region imaging material with improved contrast. Two regions containing asymmetric micro-bodies are separated by a substantially non-diffusing region. At least one of the regions containing asymmetric micro-bodies is located within the lenticules of a lenticular lens. Collimated light 1401 from a Fresnel lens is focused by the refractive surface of the lenticular lens 1403 (with its lenticules parallel to the y direction) through the asymmetric micro-bodies 1402 (with their major axis in the x direction) within the lenticular lens that predominantly scatter the light in the y-z plane. The light then passes through the non-scattering substrate matrix material 1404. This light is further focused through a matrix region 1405 containing asymmetric micro-bodies 1410 that further scatter the light predominantly in the y-z plane. The two scattering regions separated by a the substrate which is preferably of the same matrix material as 1403 and 1405 form a multi-region light scattering element. The focusing light passes through the multi-region light scattering element and through the clear apertures 1408 in the black stripe region 1406. Ambient light 1409 is absorbed in the opaque regions 1407 of the black stripe region 1406. In a further embodiment, the matrix materials 1403, 1404 and 1405 are all the same material.

Figure 15:
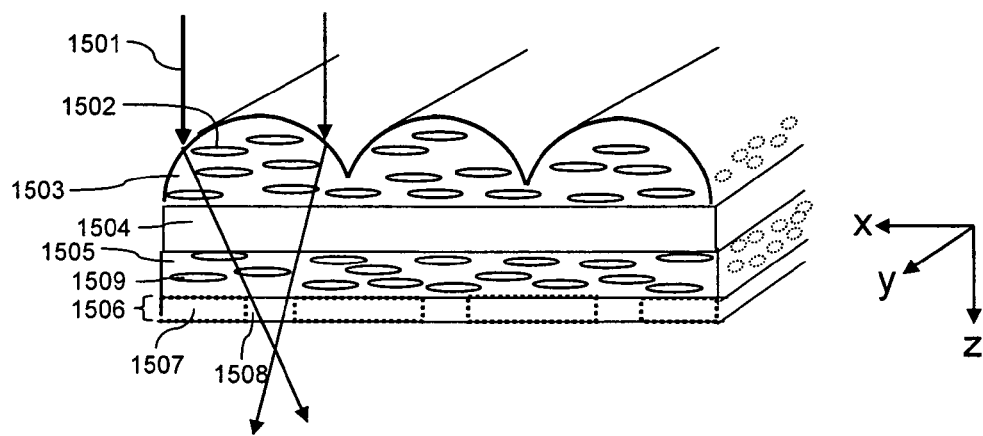
FIG. 15 is a perspective view of the exposure step of one embodiment of a method for producing the imaging material of FIG. 14.

FIG. 15 illustrates one embodiment of this invention for the method of producing the multi-region imaging material with improved contrast of FIG. 14. A multi-region imaging material is created with at least two regions containing asymmetric micro-bodies that are spaced apart by a substantially non-scattering region. At least one of these regions is located within the lenticules of a lenticular lens with a substantially non-scattering substrate located between two of the asymmetric scattering regions. The lenticules can be formed into these regions through techniques such as extrusion, casting, or embossing. The lenticular lens 1503 is optically coupled to the multi-region light scattering element which is optically coupled to a black stripe region 1506. In another step of this method, collimated exposing light 1501 is focused by the lenticular lens 1503 with its lenticules parallel to the y direction. The lenticular lens 1503 contains asymmetric micro-bodies 1502 (with their major axis in the x direction) that scatter the incident light in the y-z plane while the refraction from the lenticular lens focuses light in the x-z plane. The focusing light passes through the non-scattering matrix material substrate 1504. The light then continues to focus through a second light scattering region containing asymmetric micro-bodies 1509 in a matrix material 1505 which further scatters light predominantly in the y-z plane. The two scattering regions form a multi-region light scattering element which contains two regions with asymmetric micro-bodies 1502 and 1509 spaced apart by a matrix material 1504. The light focuses through the multi-region light scattering element and exposes a region 1508 corresponding to a clear aperture 1408 of the black stripe region 1506 after processing. The unexposed region 1507 corresponds to an opaque region 1407 after processing.

Figure 16:
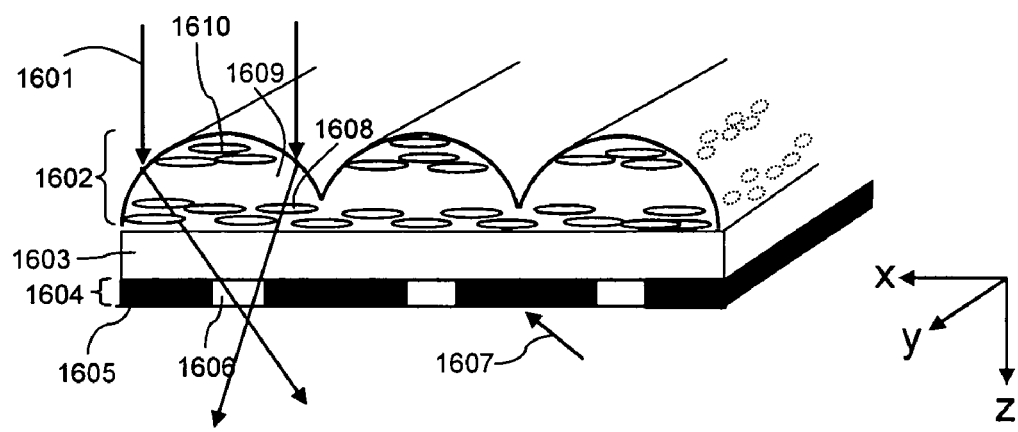
FIG. 16 is a perspective view of one embodiment of an imaging material of the invention, featuring the lenticules of a lenticular lens containing two regions containing asymmetric particles, spatially separated by a non-scattering region.

FIG. 16 illustrates another embodiment of a multi-region imaging material with improved contrast. The two regions containing asymmetric micro-bodies are separated by a substantially non-diffusing region and are located within the lenticules of a lenticular lens. Collimated light 1601 from a Fresnel lens is focused by the refractive surface of the lenticular lens formed in a matrix material 1609 (with its lenticules parallel to the y direction). This light then passess through the first region containing asymmetric micro-bodies 1610 (with their major axis in the x direction) within the matrix material 1609 that predominantly scatter the light in the y-z plane. The light then passes through the non-scattering region of the matrix material 1609 and through the second region containing asymmetric micro-bodies 1608 (with their major axis in the x direction) that further scatters the light predominantly in the y-z plane. The two scattering regions separated by a non-scattering region made of the matrix material 1609 form a multi-region light scattering element 1602 which has a refractive lenticular lens surface profile. The focusing light passes through the multi-region light scattering element, through the substrate 1603 of the lenticular lens, and through the clear apertures 1606 in the black stripe region 1604. Ambient light 1607 is absorbed in the opaque regions 1605 of the black stripe region 1604.

Figure 17:
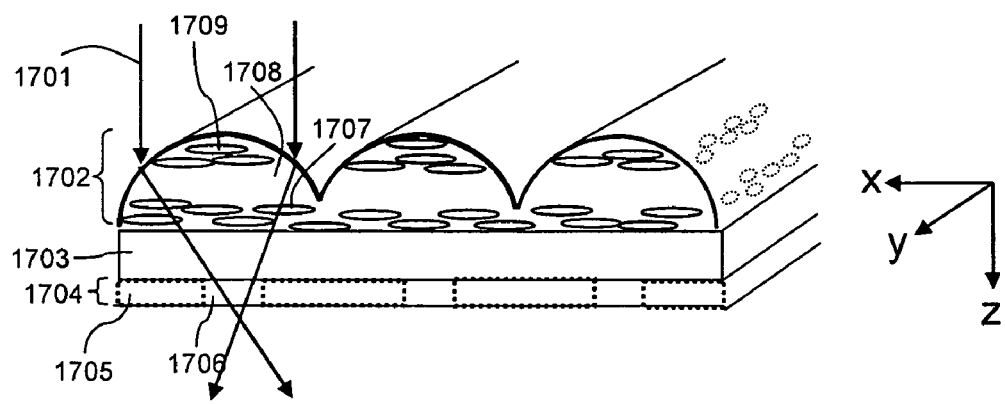
FIG. 17 is a perspective view of the exposure step of one embodiment of a method for producing the imaging material of FIG. 16.

FIG. 17 illustrates a method of producing the imaging material of FIG. 16. A multi-region imaging material is created with at least two regions containing asymmetric micro-bodies that are spaced apart by a substantially non-scattering region. At least two of these regions are located within the lenticules of a lenticular lens. The lenticules can be formed into these regions through techniques such as extrusion, casting, or embossing. The lenticular lens is optically coupled to a substrate which is optically coupled to a black stripe region. In another step of this method, collimated exposing light 1701 is focused by the lenticular lens made of matrix material 1708 with its lenticules parallel to the y direction. The lenticular lens 1708 contains two regions with asymmetric micro-bodies 1709 and 1707 (with their major axis in the x direction) within and separated by a matrix material 1708. The two scattering regions separated by a non-scattering region made of the matrix material 1708 form a multi-region light scattering element 1702 which has a refractive lenticular lens surface profile. This multi-region light scattering element scatters the incident light in the y-z plane while the refraction from the lenticular lens profile focuses in the x-z plane. The focusing light then passes through the non-scattering matrix material substrate 1703. The light focuses through the multi-region light scattering element and exposes a region 1706 corresponding to a clear aperture 1606 of the black stripe region 1506 after processing. The unexposed region 1705 corresponds to an opaque region 1605 after processing.

Figure 18:
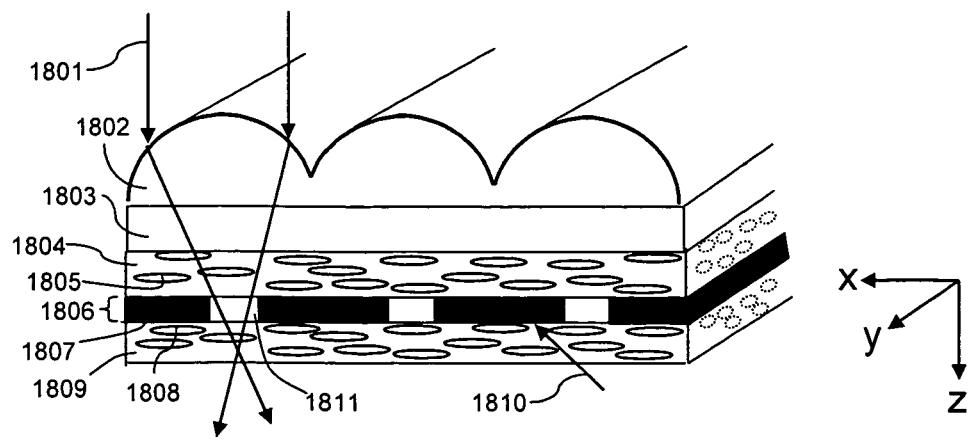
FIG. 18 is a perspective view of one embodiment of an imaging material of the invention, featuring two regions containing asymmetric micro-bodies spatially separated by a black stripe region.

FIG. 18 illustrates another embodiment of an imaging material of the invention. The two regions containing asymmetric micro-bodies are separated by a substantially non-diffusing black stripe region. The particles in the scattering regions are aligned perpendicular to the lenticules. Collimated light 1801 from a Fresnel lens is focused by the refractive surface of the lenticular lens 1802 (with its lenticules parallel to the y direction). This light then passess through the substrate 1803 and into the first region containing asymmetric micro-bodies 1805 (with their major axis in the x direction) within the matrix material 1804 that predominantly scatter the light in the y-z plane. The light then passes through the non-scattering clear apertures 1811 in the black stripe region 1806 and through the second light scattering region. The second light scattering region contains asymmetric micro-bodies 1808 in a matrix material 1809 that further scatter the light predominantly in the y-z plane. The two scattering regions separated by a non-scattering black stripe region 1806 form a multi-region light scattering element. Ambient light 1810 is absorbed in the opaque regions 1807 of the black stripe region 1806.

Figure 19:
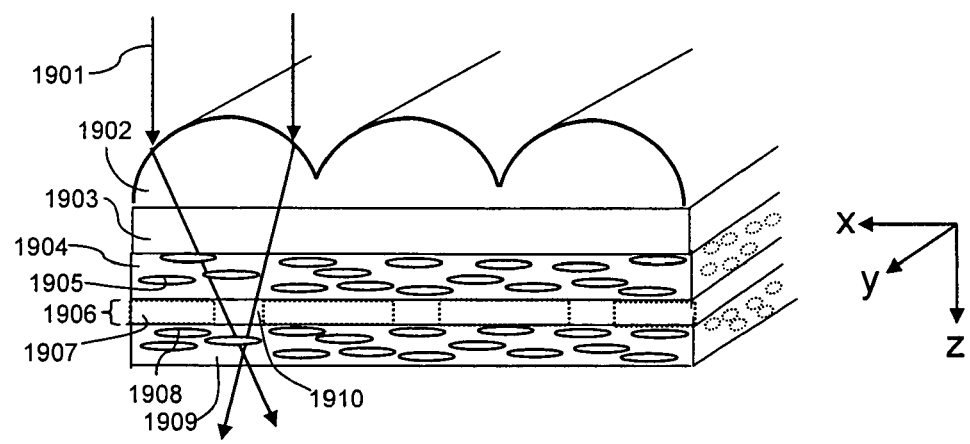
FIG. 19 is a perspective view of the exposure step of one embodiment of a method for producing the imaging material of FIG. 18.

FIG. 19 illustrates a method of producing the imaging material of FIG. 18. A multi-region imaging material is created with two regions containing asymmetric micro-bodies that are spaced apart by a black stripe region. The lenticular lens is optically coupled to a first scattering region containing asymmetric micro-bodies that are aligned substantially perpendicular to the lenticules. In another step of this method, collimated exposing light 1901 is focused by the lenticular lens 1902 with its lenticules parallel to the y direction. The light passes through the lens 1902 and its substrate 1903 and into a first light scattering region. The first light scattering region contains asymmetric micro-bodies 1905 (with their major axis in the x direction) in a matrix material 1904. The light focuses through the light scattering region and exposes a region 1910 corresponding to a clear aperture 1811 of the black stripe region 1906 after processing. The unexposed region 1907 corresponds to an opaque region 1807 after processing In a further step of this invention, a second region containing asymmetric micro-bodies 1908 aligned substantially perpendicular to the lenticules 1902 (parallel to the x direction) within a matrix material 1909 is optically coupled to the black stripe region 1906 on the viewing side of the imaging screen after processing the black stripe region 1906.

Figure 20:
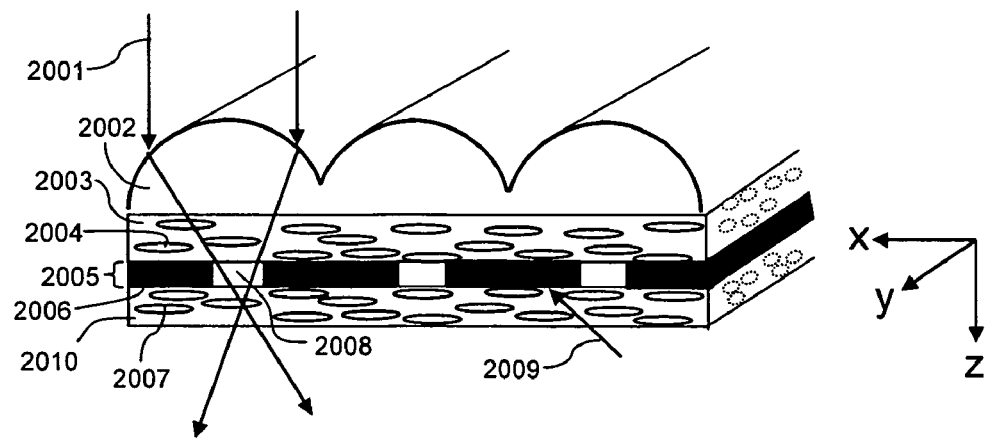
FIG. 20 is a perspective view of a variant of the imaging material illustrated in FIG. 18 with the substrate of the lenticular lens containing asymmetric micro-bodies.

FIG. 20 illustrates another multi-region imaging material of the invention. The substrate of a lenticular lens contains a region of asymmetric micro-bodies that is separated from a second region of asymmetric micro-bodies by a substantially non-diffusing black stripe region. The particles in the scattering regions are aligned perpendicular to the lenticules. Collimated light 2001 from a Fresnel lens is focused by the refractive surface of the lenticular lens 2002 (with its lenticules parallel to the y direction). This light then passess through the substrate 2003 containing asymmetric micro-bodies 2004 (with their major axis in the x direction) that predominantly scatter the light in the y-z plane. The light then passes through the non-scattering clear apertures 2008 in the black stripe region 2005 and through the second light scattering region. The second light scattering region contains asymmetric micro-bodies 2007 in a matrix material 2010 that further scatter the light predominantly in the y-z plane. The two scattering regions separated by a non-scattering black stripe region 2005 form a multi-region light scattering element. Ambient light 2009 is absorbed in the opaque regions 2006 of the black stripe region 2005

Figure 21:
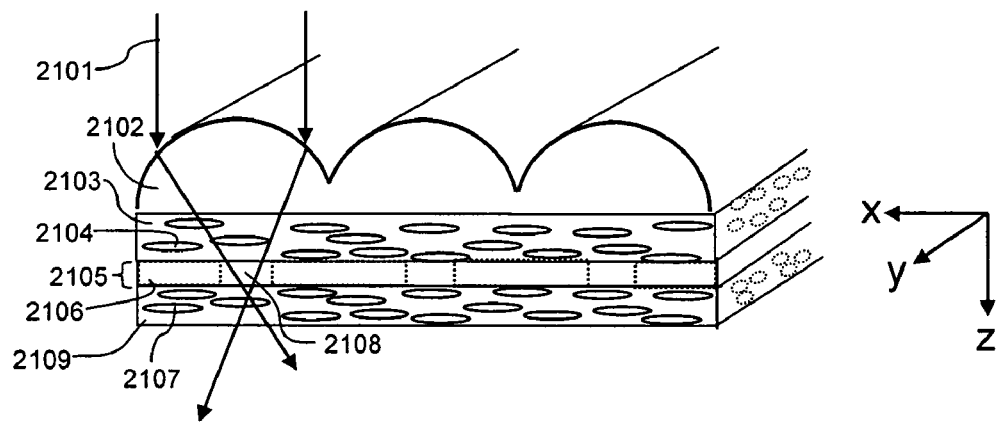
FIG. 21 is a perspective view of the exposure step of one embodiment of a method for producing the imaging material of FIG. 20.

FIG. 21 illustrates a method of producing the imaging material of FIG. 20. A region containing asymmetric micro-bodies is formed such that it is suitable as a substrate for a lenticular lens wherein the asymmetric micro-bodies are aligned substantially perpendicular to the lenticules. A lenticular structure is formed upon this substrate using a commonly known technique such as embossing, extruding or casting. A second scattering region is optically coupled to a black stripe region that separates it from the first scattering region in the substrate. In another step of this method, collimated exposing light 2101 is focused by the lenticular lens 2102 with its lenticules parallel to the y direction. The light passes through the lens 2102 and into the light scattering substrate containing asymmetric micro-bodies 2104 (with their major axis in the x direction) in a matrix material 2103. The light focuses through the light scattering region and exposes a region 2108 corresponding to a clear aperture 2008 of the black stripe region 2105 after processing. The unexposed region 2106 corresponds to an opaque region 2006 after processing In a further step of this invention, a second region containing asymmetric micro-bodies 2107 aligned substantially perpendicular to the lenticules of the lenticular lens 2102 (parallel to the x direction) within a matrix material 2109 is optically coupled to the black stripe region 2105 on the viewing side of the imaging screen post processing.

Figure 22:
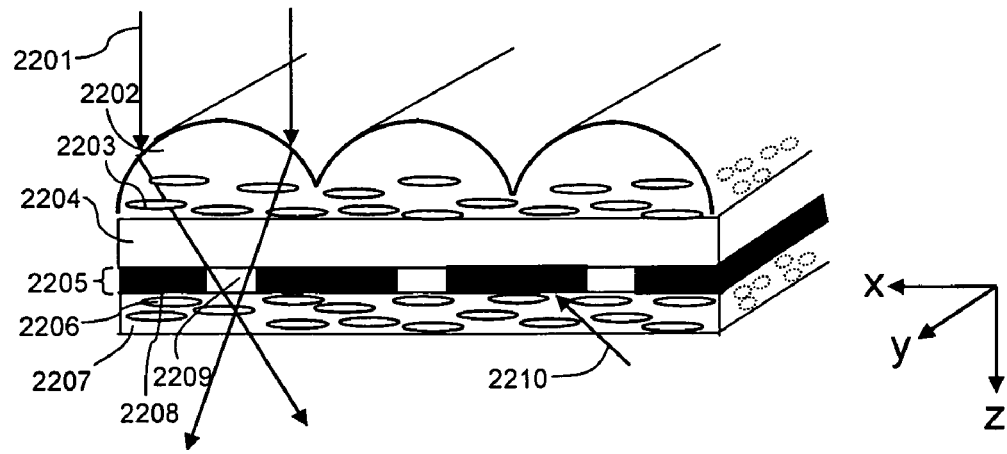
FIG. 22 is a perspective view of one embodiment of an imaging material of the invention, featuring asymmetric micro-bodies contained within the lenticules of a lenticular lens, a transmissive substrate, and a light-transmissive region on the opposite side of a black stripe region containing asymmetric particles.

FIG. 22 illustrates another embodiment of an imaging material of the invention. A scattering region within the lenticules of a lenticular lens contains asymmetric particles. The substrate of the lenticular lens and a black stripe region separate the first scattering region from a second scattering region. Collimated light 2201 from a Fresnel lens is focused by the refractive surface of the lenticular lens 2202 (with its lenticules parallel to the y direction) through the asymmetric micro-bodies 2203 (with their major axis in the x direction) within the lenticular lens that predominantly scatter the light in the y-z plane. The light then passes througth a non-scattering substrate 2204. The focusing light passes through the multi-region light scattering element and through the clear apertures 2209 in the black stripe region 2205. This light then passes through a matrix region 2207 containing asymmetric micro-bodies 2206 that further scatter the light predominantly in the y-z plane. The two scattering regions separated by a the substrate 2204 and the black stripe region 2205 form a multi-region light scattering element. Ambient light 2210 is absorbed in the opaque regions 2208 of the black stripe region 2205.

Figure 23:
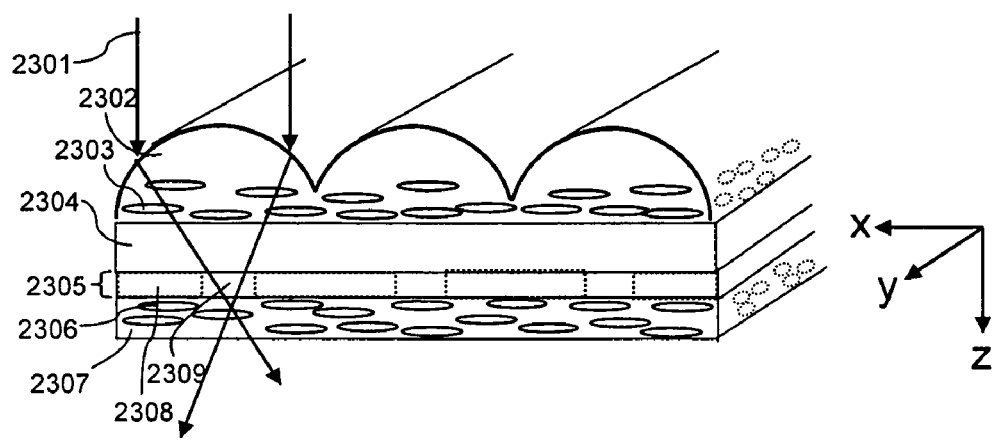
FIG. 23 is a perspective view of the exposure step of one embodiment of a method for producing the imaging material of FIG. 22.

FIG. 23 illustrates a method of producing the imaging material of FIG. 22. A light scattering region containing asymmetric micro-bodies is formed within the lenticules of a lenticular lens. The lenticules can be formed into this region through techniques such as extrusion, casting, or embossing. The lenticular lens is optically coupled to a substrate which is optically coupled to a black stripe region. In another step of this method, collimated exposing light 2301 is focused by the lenticular lens formed in a matrix material 2302 with its lenticules parallel to the y direction. The lenticular lens contains asymmetric micro-bodies 2303 (with their major axis in the x direction) in a matrix material 2302. The refracted light passes through the lens 2302 and is scattered predominantly in the y-z plane by the asymmetric micro-bodies 2303. The light focuses in the x-z plane through the light scattering region and exposes a region 2309 corresponding to a clear aperture 2209 of the black stripe region 2305 after processing. The unexposed region 2308 corresponds to an opaque region 2208 after processing In a further step of this invention, a second region containing asymmetric micro-bodies 2306 aligned substantially perpendicular to the lenticules of the lenticular lens (parallel to the x direction) within a matrix material 2307 is optically coupled to the black stripe region 2305 on the viewing side of the imaging screen after processing the black stripe region .

Figure 24:
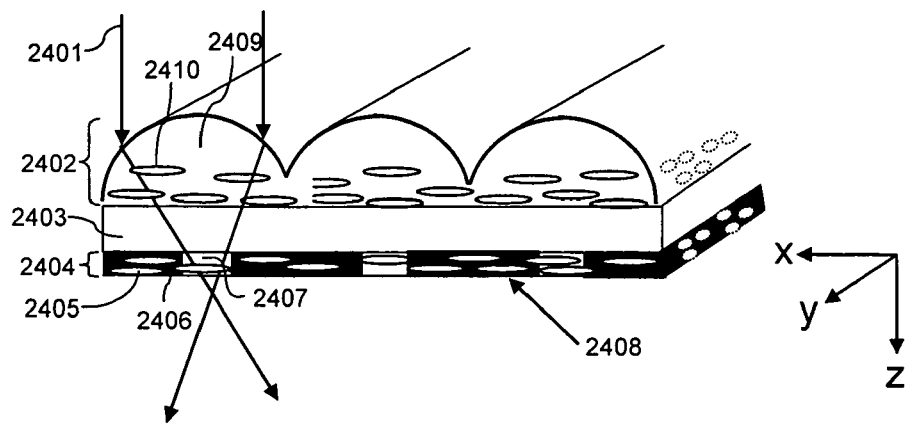
FIG. 24 is a perspective view of one embodiment of an imaging material of the invention, featuring asymmetric micro-bodies contained within the lenticules of a lenticular lens, and a black stripe region containing asymmetric particles.

FIG. 24 illustrates another embodiment of an imaging material of the invention. A scattering region within the lenticules of a lenticular lens contains asymmetric particles. The substantially non-scattering substrate of the lenticular lens separates the first scattering region from a black stripe region that contains asymmetric particles. Collimated light 2401 from a Fresnel lens is focused by the refractive surface of the lenticular lens made of matrix material 2409 (with its lenticules parallel to the y direction) through the asymmetric micro-bodies 2410 (with their major axis in the x direction) within the lenticular lens that predominantly scatter the light in the y-z plane. The light scattering element 2402 scatters the light predominantly in the y-z plane while focusing the light in the x-z plane. The light then passes througth a non-scattering substrate 2403 and into the clear apertures 2407 in the light scattering black stripe region 2404. The light scattering black stripe region 2404 contains asymmetric micro-bodies 2405 that further scatter the light predominantly in the y-z plane. The two scattering regions 2402 and 2404 separated by a the substrate 2403 form a multi-region light scattering element. Ambient light 2408 is absorbed in the opaque regions 2406 of the black stripe region 2404.

Figure 25:
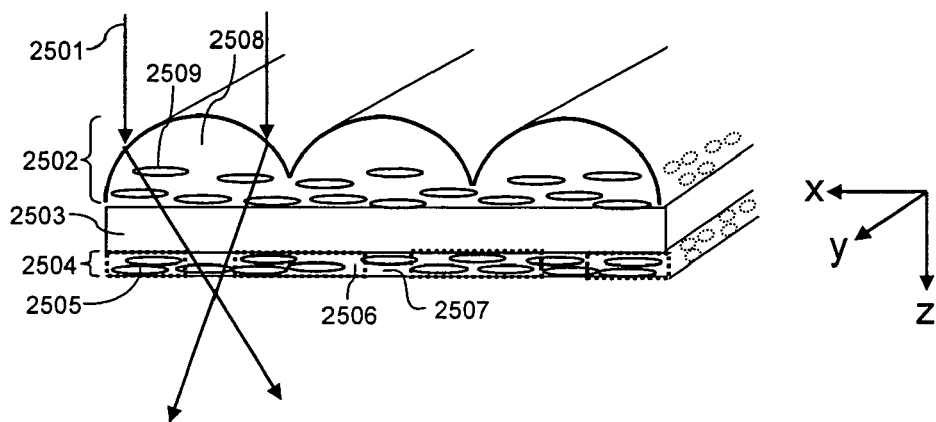
FIG. 25 is a perspective view of the exposure step of one embodiment of a method for producing the imaging material of FIG. 24.

FIG. 25 illustrates a method of producing the imaging material of FIG. 24. A light scattering region containing asymmetric micro-bodies is located within the lenticules of a lenticular lens. The lenticules can be formed into this region through techniques such as extrusion, casting, or embossing. The lenticular lens is optically coupled to a non-scattering substrate which is optically coupled to a black stripe region. The black stripe region contains asymmetric particles. In another step of this method, collimated exposing light 2501 is focused by the lenticular lens formed in a matrix material 2508 with its lenticules parallel to the y direction. The lenticular lens contains asymmetric micro-bodies 2509 (with their major axis in the x direction) in a matrix material 2508. The refracted light passes through the lens and is scattered predominantly in the y-z plane by the asymmetric micro-bodies 2509. The light focuses in the x-z plane through the first light scattering region 2502 and its substrate 2503 and exposes a region 2507 corresponding to a clear aperture 2407 of the black stripe region 2504 after processing. The clear aperture 2407 contains asymmetric micro-bodies 2505 (with their major axis in the x direction) that further scatter light in the y-z plane. The unexposed region 2506 corresponds to an opaque region 2406 after processing.

Figure 26:
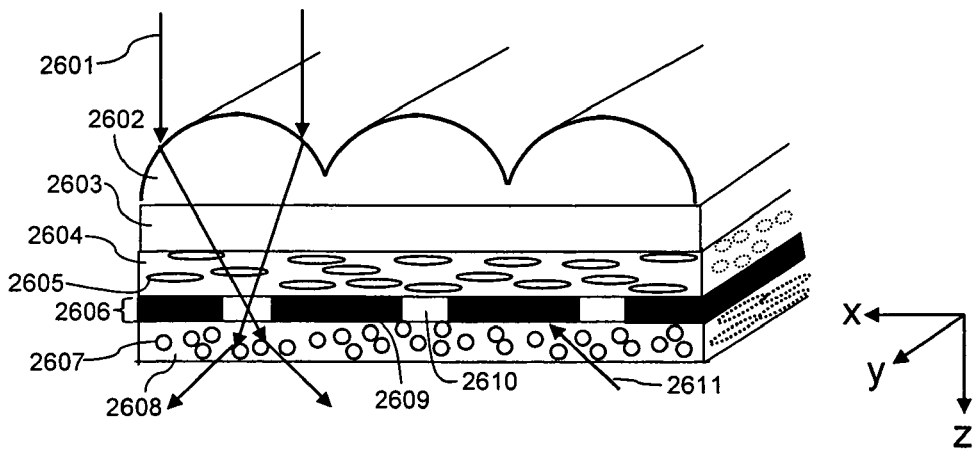
FIG. 26 is a perspective view of one embodiment of an imaging material of the invention, featuring a black stripe region separating two regions containing asymmetric micro-bodies with the axis of asymmetry of the two regions substantially orthogonal.

FIG. 26 illustrates another embodiment of an imaging material of the invention. A first scattering region containing asymmetric micro-bodies is optically coupled to the substrate of a lenticular lens. The particles in the first scattering region are aligned perpendicular to the lenticules. Collimated light 2601 from a Fresnel lens is focused by the refractive surface of the lenticular lens 2602 (with its lenticules parallel to the y direction). This light then passess through the substrate 2603 and into the first region containing asymmetric micro-bodies 2605 (with their major axis in the x direction) within the matrix material 2604 that predominantly scatter the light in the y-z plane. The light then passes through the non-scattering clear apertures 2610 in the black stripe region 2606 and through the second light scattering region. The second light scattering region contains asymmetric micro-bodies 2607 in a matrix material 2608 (with their major axis in the y direction) that further scatter the light predominantly in the x-z plane. The two scattering regions separated by a non-scattering black stripe region 2606 form a multi-region light scattering element. Ambient light 2611 is absorbed in the opaque regions 2609 of the black stripe region 2606.

In this embodiment, the first scattering region substantially controls the amount of scattering and spread of the viewing angle in the vertical (y-z) plane. The second scattering region expands the scattering of light in the horizontal (x-z) plane caused by the lenticular lens. In this embodiment, both the horizontal and vertical viewing angles can be independently controlled. By spacing the regions apart with a non-diffusing region, a multi-region light scattering imaging material is created that exhibits reduced speckle contrast. Similar configurations can be made by placing the first scattering region within the substrate or within the lenticules of the lenticular lens. Additionally, the second scattering region may contain substantially symmetric particles that contribute to the broadening of the viewing angles in the horizontal and vertical directions.

Figure 27:
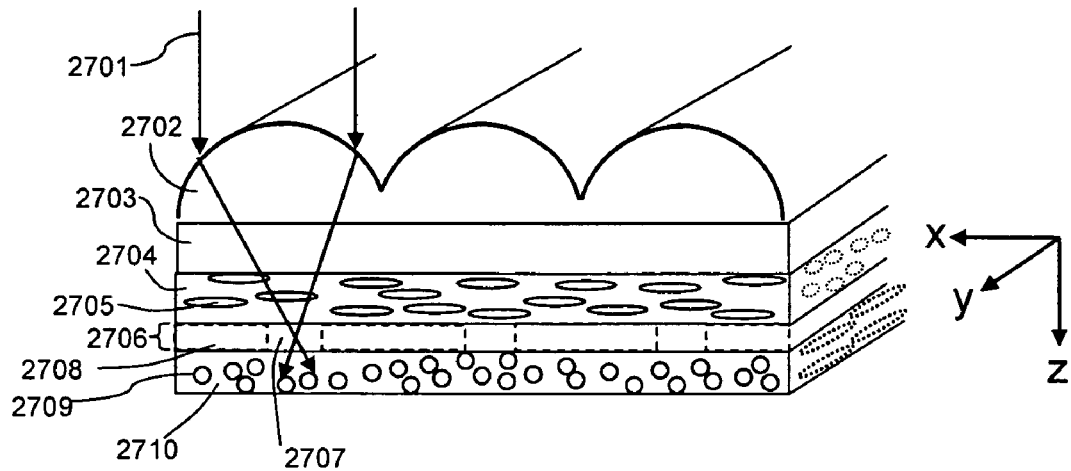
FIG. 27 is a perspective view of the exposure step of one embodiment of a method for producing the imaging material of FIG. 26.

FIG. 27 illustrates a method of producing the imaging material of FIG. 26. A lenticular lens is optically coupled to a first scattering region containing asymmetric micro-bodies that are aligned substantially perpendicular to the lenticules. This first scattering region is optically coupled to a black stripe region. In another step of this method, collimated exposing light 2701 is focused by the lenticular lens 2702 with its lenticules parallel to the y direction. The light passes through the lenticular lens 2702 and its substrate 2703 and into a first light scattering region. The first light scattering region contains asymmetric micro-bodies 2705 (with their major axis in the x direction) in a matrix material 2704. The light focuses through the light scattering region and exposes a region 2707 corresponding to a clear aperture 2610 of the black stripe region 2706 after processing. The unexposed region 2708 corresponds to an opaque region 2609 after processing In a further step of this invention, a second region containing asymmetric micro-bodies 2709 aligned substantially parallel to the lenticules (parallel to the y direction) within a matrix material 2710 is optically coupled to the black stripe region 2706 on the viewing side of the imaging screen after processing the black stripe region 2706.

Figure 28:
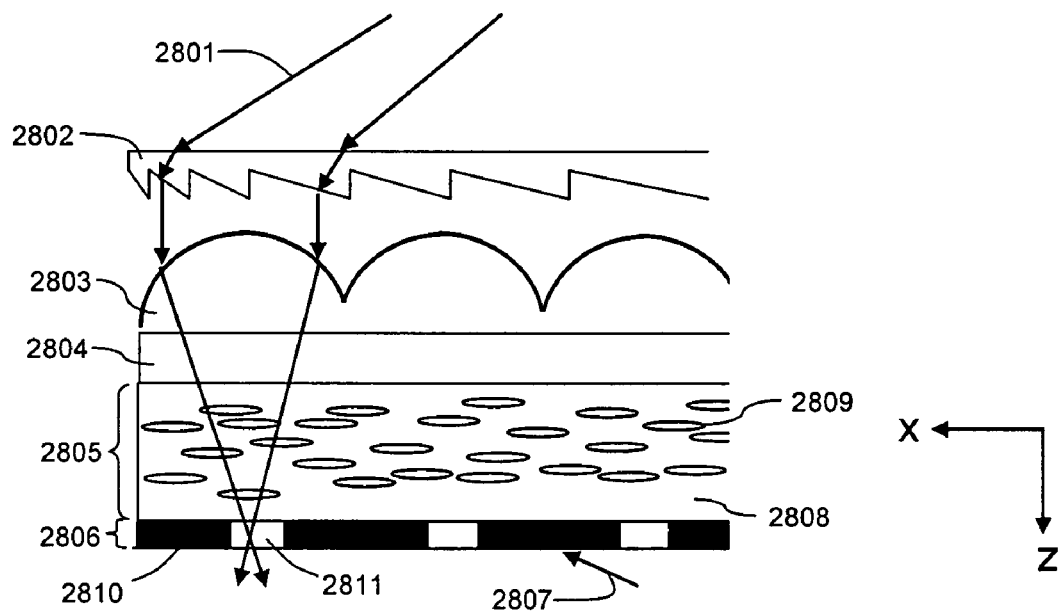
FIG. 28 is a perspective view of one embodiment of a projection screen comprised of the imaging element of FIG. 2 combined with a Fresnel lens.

FIG. 28 illustrates a projection screen comprising the imaging material with high contrast of FIG. 2, and a Fresnel lens. Diverging light 2801 from a projection engine is substantially collimated by the Fresnel lens 2802 and this light is focused by the lenticular lens 2803 through the substrate 2804 and the asymmetric scattering region 2805. The asymmetric light scattering region 2805 contains asymmetric micro-bodies 2809 aligned substantially perpendicular to the lenticules (parallel to the x direction) within a matrix material 2808. The light then passes through the non-scattering clear apertures 2811 in the black stripe region 2806. Ambient light 2807 is absorbed in the opaque regions 2810 of the black stripe region 2806.

The light encountering the asymmetric micro-bodies 2809 predominantly scatters in the vertical direction (y-z plane), thus maintaining the narrow focused line width in the black stripe region. Thus, the lenticular lens gives the screen an acceptable horizontal viewing cone and the asymmetric diffusing region results in a controllable viewing angle in the vertical direction. A projection screen can be formed using the other imaging elements described herein as screens themselves or through combinations with collimating optics such as a Fresnel lens and substrates and additional coatings or surface modifications.

Figure 29:
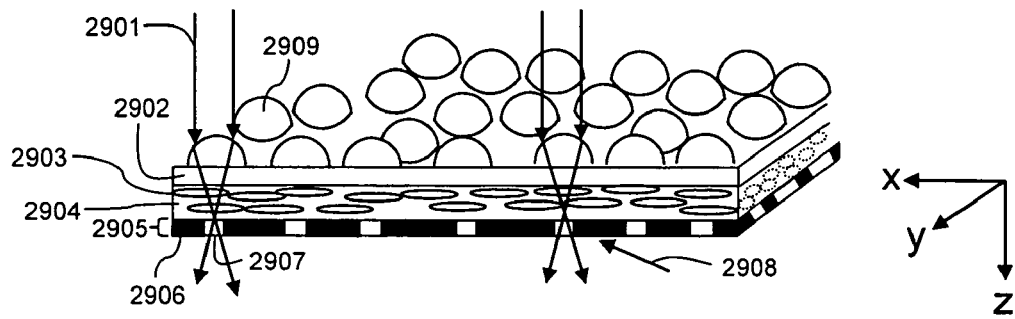
FIG. 29 is a perspective view of one embodiment of an imaging material of the invention, featuring a microbead screen.

FIG. 29 illustrates one embodiment of an imaging material of the invention. A micro-bead screen is optically coupled to a region containing asymmetric particles. This scattering region is optically coupled to a black stripe region. Collimated light 2901 from a Fresnel lens is focused by the refractive surface of the micro-bead refractive surfaces 2909 through a substrate 2902 and a light scattering region containing asymmetric micro-bodies 2903 (with their major axis in the x direction) within a matrix material 2904. The asymmetric micro-bodies 2903 scatter the light predominantly in the y-z plane. The light then focuses into the clear apertures 2907 in the controlled light transmissive region 2907. Ambient light 2908 is absorbed in the opaque regions 2906 of the controlled light transmissive region 2905. The black regions absorb ambient light while the imaging light is directed through the clear apertures. In a preferred embodiment, the amount of asymmetric diffusion may be very small in order to maintain a high ambient light image contrast. In a more preferred embodiment, the FWHM diffusion angles in at least one of the horizontal and vertical directions is less than 60 degrees. A multi-region light scattering element may also be used in combination with the micro-bead refractive surfaces and controlled light transmissive region.

Figure 30:
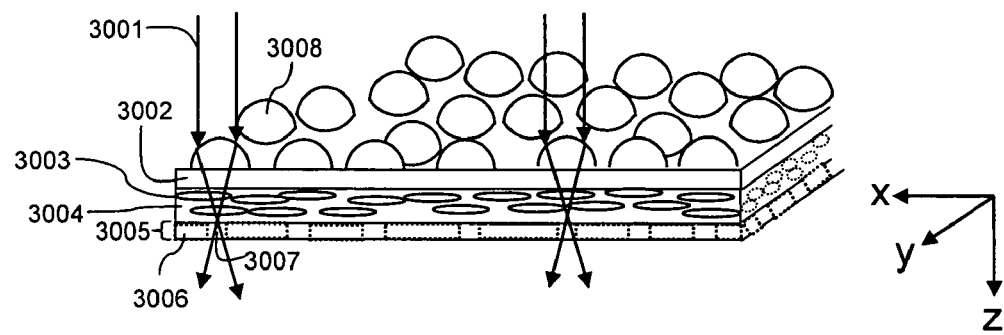
FIG. 30 is a perspective view of the exposure step of one embodiment of a method for producing the imaging material of FIG. 29.

FIG. 30 illustrates a method of producing the imaging material of FIG. 29. A micro-bead screen is created by known techniques such as adding beads to an uncured region of polymer material and then processing for curing and securing the particles in the material. Other methods are known to those in the field. A region containing asymmetric microbodies is optically coupled to the micro-bead screen and a clear aperture region. In another step of this method, collimated exposing light 3001 is focused by the micro-bead refractive surfaces 3008. The light passes through the substrate 3002 and into a light scattering region. The light scattering region contains asymmetric micro-bodies 3003 (with their major axis in the x direction) in a matrix material 3004. The light focuses through the light scattering region and exposes a region 3007 corresponding to a clear aperture 2907 of the controlled light transmissive region 2905 after processing. The unexposed region 3006 corresponds to an opaque region 2906 after processing. The asymmetric scattering region may be a multi-region light scatterin element formed by two regions with asymmetric micro-bodies separated by a non-scattering region. The imaging material of FIG. 30 may be used as a projection screen, or combined with a Fresnel lens or other light-collimating element to form a projection screen.

Figure 31:
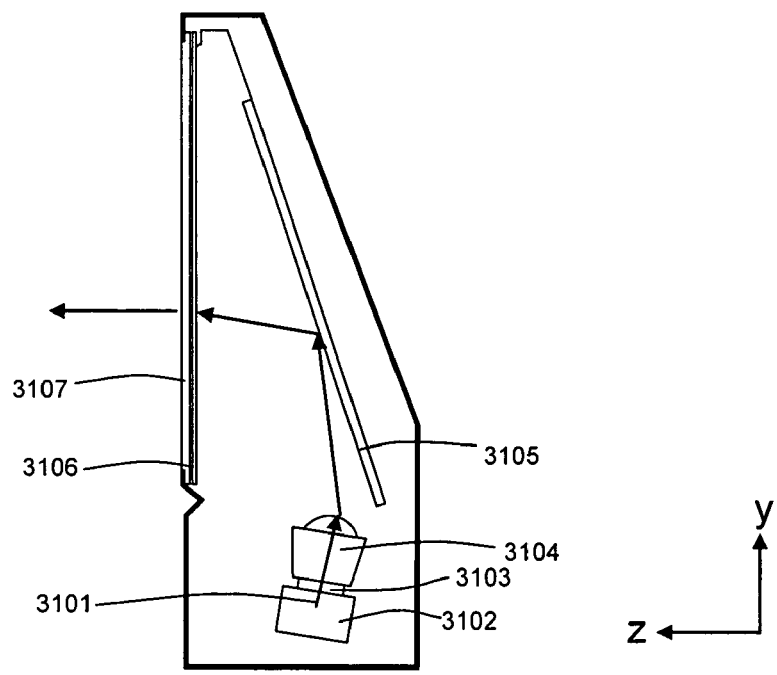
FIG. 31 is a cross-sectional view of a projection display utilizing the imaging material of FIG. 2.

FIG. 31 illustrates an embodiment of a projection system using a screen assembly containing an imaging element. Light 3101 from a lamp 3102 is directed through a liquid crystal based light valve 3103 and into a projection lens 3104. This light reflects off of a mirror 3105 and into the a Fresnel lens 3106 and into a screen assembly 3107 containing a the imaging element of FIG. 2. The imaging element provides improved contrast by reducing amount of reflected ambient light.

Preferred embodiments of the present invention are illustrated in the following Example(s). The following examples are given for the purpose of illustrating the invention, but not for limiting the scope or spirit of the invention.

EXAMPLE 1

A projection screen, in accordance with the present invention, can be produced as described in FIG. 18, that is designed to have increased ambient light absorption and increased gain. This is possible because the diffusion in the vertical plane is achieved by an asymmetric diffuser located before the black stripe region. This enables a diffuser added on the viewer side of the black stripe region to have reduced diffusion angles, and as a result, less backscatter. The additional diffuser also reduces the speckle contrast.

A comparative sample for reference to prior art was first made. Sample S1 was made by first index matching a lenticular lens from Reflexite Corporation to a photopolymer film Cromalin™ from DuPont using an index matching fluid with a refractive index of 1.51. The Cromalin™ was exposed through the lenticular lens by collimated UV light. Toner was then applied to the sample achieving a black stripe pattern. A symmetric diffuser with a FWHM of 16 degrees by 16 degrees and gain of 19 was created by dispersing 30% by weight polyethylene particles of refractive index 1.51 within a matrix material of polyester of refractive index 1.568. This was optically coupled to the black stripe region using an index matching fluid with a refractive index of 1.51. A transparent acrylic substrate was then added on the viewer side to support the screen. The resulting screen has a the configuration of FIG. 1 except for the addition of a substrate for support. The gain and angles of view were measured with an EZContrast imaging system from Eldim using collimated illumination. The gain was measured to be 6 and the angles of view were measured to be FWHM of 51 degrees by 21 degrees. The ambient light absorption was measured by looking at the diffuse reflectance in a d/8 geometry. A Minolta CM-508d was used to measure the diffuse reflectance of the screen sample S1 by placing the screen above a black velour and measuring the reflectance of diffuse illumination from 8 degrees with the specular component excluded (SCE). The d/8 reflectance of S1 was 4%.

Sample A1 was made by first creating an asymmetric diffuser with a FWHM of 18 degrees by 6 degrees and Gain of 44 by dispersing 30% by weight polyethylene particles with a refractive index of 1.51 within a matrix material of polyester with a refractive index of 1.568 and stretching the material as described in U.S. Pat. No. 5,932,342. This asymmetric diffuser was index matched to a lenticular lens from Reflexite Corporation to using an index matching fluid with a refractive index of 1.51. A photopolymer film Cromalin™ from DuPont was index matched to the other side of the asymmetric diffuser using an index matching fluid with a refractive index of 1.51. The Cromalin™ was exposed through the lenticular lens by collimated UV light. Toner was then applied to the sample achieving a black stripe pattern.

An additional asymmetric diffuser was optically coupled to the Cromalin™ using an index matching fluid to the viewer side of the black stripe region to diffuse the specular component of the light source seen in the horizontal direction and to reduce the speckle contrast of the screen. The second asymmetric diffuser with a FWHM of 20 degrees by 11 degrees and gain of 19 was created by dispersing 30% by weight polyethylene particles with a refractive index of 1.51 within a matrix material of polyester with a refractive index of 1.568 and stretching the material as described in U.S. Pat. No. 5,932,342. A transparent acrylic substrate was then added on the viewer side to support the screen. The resulting screen has a the configuration of FIG. 18 except for the addition of the substrate for support. The gain and angles of view were measured with an EZContrast imaging system from Eldim. The gain was measured to be 5 and the angles of view were measured to be FWHM of 48 degrees by 21 degrees. The ambient light absorption was measured by looking at the diffuse reflectance in a d/8 geometry. A Minolta CM-508d was used to measure the diffuse reflectance of the screen sample A1 by placing the screen above a black velour and measuring the reflectance of diffuse illumination from 8 degrees excluding the specular component. The d/8 reflectance of A1 was 2.6%. The results are shown in Table 1 below.

The results show that with similar angles of view and gain, the sample A1 has a significantly reduced diffuse reflectance (from 4% to 2.6%) relative to S1. This equates to a dramatic increase in display contrast in ambient light.

EXAMPLE 2

A projection screen, in accordance with the present invention, can be produced as described in FIG. 18, that is designed to have increased ambient light absorption and increased gain. This is possible because the diffusion in the vertical plane is achieved by an asymmetric diffuser located before the black stripe region. This enables the diffuser on the viewer side of the black stripe region to have reduced diffusion angles, and as a result, less backscatter.

Sample A2 was made by first creating an asymmetric diffuser with a FWHM of 18 degrees by 6 degrees and gain of 44 by dispersing 30% by weight polyethylene particles with a refractive index of 1.51 within a matrix material of polyester with a refractive index of 1.568 and stretching the material as described in U.S. Pat. No. 5,932,342. This asymmetric diffuser was index matched to a lenticular lens from Reflexite Corporation to using an index matching fluid with a refractive index of 1.51. A photopolymer film Cromalin™ from DuPont was index matched to the other side of the asymmetric diffuser using an index matching fluid with a refractive index of 1.51. The Cromalin™ was exposed through the lenticular lens by collimated UV light. Toner was then applied to the sample achieving a black stripe pattern.

An additional asymmetric diffuser was optically coupled to the Cromalin™ using an index matching fluid to the viewer side of the black stripe region to diffuse the specular component of the light source seen in the horizontal direction and to reduce the speckle contrast of the screen. The second asymmetric diffuser has a FWHM of 40 degrees by 20 degrees and gain of 7.4. It was created by dispersing 10% by weight polyethylene particles with a refractive index of 1.51 within a matrix material of polyester with a refractive index of 1.568 and stretching the material as described in U.S. Pat. No. 5,932,342. A transparent acrylic substrate was then added on the viewer side to support the screen. The resulting screen has a the configuration of FIG. 18 except for the addition of the substrate for support. The gain and angles of view were measured with an EZContrast imaging system from Eldim. The gain was measured to be 3 and the angles of view were measured to be FWHM of 64 degrees by 35 degrees. The ambient light absorption was measured by looking at the diffuse reflectance in a d/8 geometry. A Minolta CM-508d was used to measure the diffuse reflectance of the screen sample A2 by placing the screen above a black velour and measuring the reflectance of diffuse illumination from 8 degrees excluding the specular component. The d/8 reflectance of A2 was 2.4%.

These results show that be increasing the angles relative to that for the S1 sample, the very low diffuse reflectance can be achieved. The gain will naturally be lower for larger viewing angles, but the low reflectance ensures high image contrast by absorbing more ambient light.

EXAMPLE 3

A projection screen, in accordance with the present invention, can be produced as described in FIG. 2, that is designed to have increased ambient light absorption and increased gain. This is possible because the diffusion in the vertical plane is achieved by an asymmetric diffuser located before the black stripe region. By eliminating the need for a second diffuser on the viewer side of the black stripe region, the ambient light absorption is improved.

Sample A3 was made by first creating an asymmetric diffuser with a FWHM of 18 degrees by 6 degrees and gain of 44 by dispersing 30% by weight polyethylene particles with a refractive index of 1.51 within a matrix material of polyester with a refractive index of 1.568 and stretching the material as described in U.S. Pat. No. 5,932,342. This asymmetric diffuser was index matched to a lenticular lens from Reflexite Corporation to using an index matching fluid with a refractive index of 1.51. A photopolymer film Cromalin™ from DuPont was index matched to the other side of the asymmetric diffuser using an index matching fluid with a refractive index of 1.51. The Cromalin™ was exposed through the lenticular lens by collimated UV light. Toner was then applied to the sample achieving a black stripe pattern. A transparent acrylic substrate was then added on the viewer side to support the screen. The resulting screen has a the configuration of FIG. 2 except for the addition of the substrate for support.

The gain and angles of view of A3 were measured with an EZContrast imaging system from Eldim. The gain was measured to be 15 and the angles of view were measured to be FWHM of 50 degrees by 5 degrees. The ambient light absorption was measured by looking at the diffuse reflectance in a d/8 geometry. A Minolta CM-508d was used to measure the diffuse reflectance of the screen sample A3 by placing the screen above a black velour and measuring the reflectance of diffuse illumination from 8 degrees excluding the specular component. The d/8 reflectance of A3 was 1.3%.

The significantly increased gain and the reduced diffuse reflectance illustrate the improved performance for this invention. The viewing angle can be tailored for low vertical angle of view applications, as in this example, or higher vertical angle of views by choosing an asymmetric diffuser with larger diffusion angles. The sample A3 illustrates a higher gain performance with lower diffuse reflectance, thus achieving higher display performance through the increased contrast due to high ambient light absorption.

Table 1 demonstrates the key performance parameters that are predicted if a screen is produced as described in previous examples, and in accordance with the present invention.

TABLE 1

| Sample # | FWHM Horizontal (Degrees) | FWHM Vertical (Degrees) | Gain | Diffuse Reflectance (%) (d/8 SCE) |
|---|---|---|---|---|
| S1 | 51 | 21 | 6 | 4 |
| A1 | 48 | 21 | 5 | 2.6 |
| A2 | 64 | 35 | 3 | 2.4 |
| A3 | 50 | 5 | 15 | 1.3 |

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. A projection screen with improved contrast comprising:
  a) a first outer extended surface comprising a plurality of light-transmissive refractive optical elements having a first set of active surfaces and a first set of predetermined focal points;
  b) a controlled light-transmissive region with an opaque region and a plurality of light transmitting apertures located substantially near the first set of focal points;
  c) a first asymmetric light scattering region having a first major axis of diffusion and a first minor axis of diffusion disposed between the first outer extended surface and the controlled light-transmissive region;
  d) a second light scattering region;
whereby the diffuse reflectance of the projection screen is less than 4 percent.

2. The projection screen of claim 1 wherein the second light scattering region asymmetrically scatters light.

3. The projection screen of claim 2 wherein the second light scattering region has a second major axis of diffusion and a second minor axis of diffusion wherein the second major axis of diffusion is substantially perpendicular to the first major axis of diffusion.

4. The projection screen of claim 2 wherein the second light scattering region has a second major axis of diffusion and a second minor axis of diffusion wherein the second major axis of diffusion is substantially parallel to the first major axis of diffusion.

5. The projection screen of claim 1 wherein the second light scattering region is disposed within the light transmitting apertures.

6. The projection screen of claim 1 wherein the controlled light-transmissive region is disposed between the first light scattering region and the second light scattering region.

7. The projection screen of claim 6 wherein the second light scattering region is a surface relief structure.

8. The projection screen of claim 6, wherein the plurality of refractive optical elements is an array of lenticules.

9. The projection screen of claim 8, wherein the lenticules are substantially parallel to the first major axis of diffusion.

10. The projection screen of claim 1 wherein the first asymmetric light scattering region comprises a first matrix material of a first refractive index $n_M$ along a first axis and at least one asymmetrically shaped micro-body of a second refractive index $n_E$ along the first axis dispersed within the first matrix material such that $|n_M - n_E| > 0.005$.

11. The projection screen of claim 10, wherein the first asymmetric light scattering region comprises a material selected from the group consisting of acrylics, styrenics, olefins, polycarbonates, polyesters, polyetherimides, polyarylates, cellulosics, or copolymers of one of the aforementioned polymers.

12. The projection screen of claim 10, wherein the asymmetric micro-bodies are made of a material selected from the group consisting of acrylics, styrenics, olefins, polycarbonates, polyesters, polyetherimides, polyarylates, cellulosics, or copolymers of one of the aforementioned polymers.

13. The projection screen of claim 1, further comprising a hardcoat, anti-glare, or anti-reflection layer.

14. The projection screen of claim 1, having a gain in the range of greater than 1.

15. A projection display system comprising the projection screen of claim 1.

* * * * *